US008252858B2

(12) United States Patent
Kishore et al.

(10) Patent No.: US 8,252,858 B2
(45) Date of Patent: Aug. 28, 2012

(54) LOW SMOKE DENSITY POLY(ARYLENE ETHER) COMPOSITIONS, METHODS, AND ARTICLES

(75) Inventors: Avadhanula Venkata Subramanya Kishore, Bangalore (IN); Chandra Sekhar Bajgur, Karnataka (IN); Anantharaman Dhanabalan, Karnataka (IN); Vijay Mhetar, Slingerlands, NY (US); Amol Adhikrao Mohite, Karnataka (IN); Abhijit Anand Namjoshi, Slingerlands, NY (US); Nivedita Shishupal Sangaj, Karnataka State (IN); Kirti Sharma, Bergen op Zoom (NL); Sumi Suvarna, Karnataka (IN)

(73) Assignee: Sabic Innovative Plastics IP B.V. (NL)

( * ) Notice: Subject to any disclaimer, the term of this patent is extended or adjusted under 35 U.S.C. 154(b) by 102 days.

(21) Appl. No.: 11/770,072

(22) Filed: Jun. 28, 2007

(65) Prior Publication Data
US 2008/0167407 A1 Jul. 10, 2008

Related U.S. Application Data

(60) Provisional application No. 60/884,335, filed on Jan. 10, 2007.

(51) Int. Cl.
*C08G 18/77* (2006.01)
(52) U.S. Cl. ........................... 524/115; 524/131
(58) Field of Classification Search ................ 524/131
See application file for complete search history.

(56) References Cited

U.S. PATENT DOCUMENTS

| | | | |
|---|---|---|---|
| 2,909,549 A | 10/1959 | Bailey | |
| 3,496,236 A | 2/1970 | Cooper et al. | |
| 3,737,479 A | 6/1973 | Haaf | |
| 3,835,200 A * | 9/1974 | Lee, Jr. | 524/504 |
| 4,365,042 A | 12/1982 | Cooper et al. | |
| 4,410,651 A * | 10/1983 | Haaf et al. | 524/127 |
| 4,446,090 A | 5/1984 | Lovgren et al. | |
| 4,487,858 A | 12/1984 | Lovgren et al. | |
| 4,504,613 A * | 3/1985 | Abolins et al. | 524/125 |
| 4,528,324 A | 7/1985 | Chung et al. | |
| 4,654,405 A * | 3/1987 | Jalbert et al. | 525/391 |
| 4,684,682 A | 8/1987 | Lee, Jr. | |
| 4,731,411 A | 3/1988 | Lucas | |
| 4,732,938 A * | 3/1988 | Grant et al. | 525/391 |
| 4,816,510 A * | 3/1989 | Yates, III | 524/449 |
| 4,946,882 A | 8/1990 | Haaf et al. | |
| 5,204,438 A | 4/1993 | Snow et al. | |
| 5,258,455 A | 11/1993 | Laughner et al. | |
| 5,281,686 A | 1/1994 | Blohm et al. | |
| 5,357,022 A | 10/1994 | Banach et al. | |
| 5,391,594 A | 2/1995 | Romenesko et al. | |
| 5,508,323 A | 4/1996 | Romenesko et al. | |
| 5,880,221 A | 3/1999 | Liska et al. | |
| 5,925,779 A | 7/1999 | Cray et al. | |
| 6,166,115 A * | 12/2000 | Landa | 524/115 |
| 6,180,716 B1 | 1/2001 | Majumdar | |
| 6,194,496 B1 * | 2/2001 | Weber et al. | 524/127 |
| 6,258,879 B1 | 7/2001 | Adedeji et al. | |
| 6,258,968 B1 | 7/2001 | Eversheim et al. | |
| 6,433,768 B1 * | 8/2002 | Miyazawa et al. | 345/98 |
| 6,482,912 B2 | 11/2002 | Boudjouk et al. | |
| 6,833,096 B2 * | 12/2004 | Wang et al. | 264/102 |
| 2003/0109650 A1 * | 6/2003 | Campbell et al. | 525/461 |
| 2004/0260036 A1 * | 12/2004 | Fishburn | 525/474 |
| 2005/0038203 A1 * | 2/2005 | Elkovitch et al. | 525/397 |
| 2006/0217469 A1 * | 9/2006 | Bauer et al. | 524/115 |

FOREIGN PATENT DOCUMENTS

| | | |
|---|---|---|
| EP | 0 273 150 A2 | 7/1988 |
| EP | 0 369 376 B1 | 5/1990 |
| JP | 02201811 A * | 1/1989 |

OTHER PUBLICATIONS

Ebewele, Robert O., Polymer Science and Technology, 1996, CRC Press, pp. 281-285.*
Ishida, H. Derwent abstract 1990-286361.*
EP0501163; Sep. 2, 1992; Abstract Only (1 page).
ASTM D256-06-06a; Standard Test Methods for Determining the Izod Pendulum Impact Resistance of Plastics (20 pages).
ASTM D648-06; Standard Test Method for Deflection Temperature of Plastics Under Flexural Load in the Edgewise Position (13 pages).
UL 94; Dec. 12, 2003; Tests for Flammability of Plastic Materials for Parts in Devices and Appliances (52 pages).
ISO 180:2000(E); Plastics-Determination of Izod impact strength (16 pages).
International Search Report; International Application No. PCT/US2007/015143; International Filing Date Jun. 28, 2007; Date of Mailing Aug. 11, 2007 (6 pages).
PCT Written Opinion of the.International Searching Authority; International Application No. PCT/US2007/015143; International Filing Date Jun. 28, 2007.
Pape et al., "The Role of Silicone Powders in Reducing the Heat Release Rate and Evolution of Smoke in Flame Retardant Thermoplastics", Journal of Vinyl & Additive Technology, 1997, 3(3), 225-232; Abstract Only (2 pages).
Pape et al., "New Silicone Additives for Thermoplastic Resins: Effect on Processing and Physical Properties", Engineering Plastics, vol. 9, No. 5, 1996, pp. 351-363.
Pape et al., "The Role of Silicone Powders in Reducing the Heat Release Rate and Evolution of Smoke in Flame Retardant Thermoplastics", Annual Technical Conference-Society of Plastics Engineers (1997), 55$^{th}$(vol. 3), pp. 2941-2952.
Levchik et al., "Application and Mode of Fire Retardant Action of Aromatic Phosphates", Additives '99, International Conference, 8$^{th}$, San Francisco, Mar. 22-24, 1999, Paper 26/1-Paper 26/9.

(Continued)

*Primary Examiner* — Doris Lee
(74) *Attorney, Agent, or Firm* — Cantor Colburn LLP

(57) ABSTRACT

Thermoplastic compositions and methods of making the compositions are disclosed. The thermoplastic compositions include poly(arylene ether), a poly(alkenyl aromatic), an organophosphate ester flame retardant, a functionalized polysiloxane, and an organic acid. The thermoplastic compositions produce surprisingly low smoke density when burned, and they are useful for the fabrication of articles for the transportation and building and construction industries.

28 Claims, No Drawings

OTHER PUBLICATIONS

Levchik et al., Mechanistic Study of Fire Retardant Action of Resorcinol Bis(diphenyl Phosphate) in PC/ABS and PPO/HIPS Blends, Recent Advances in Flame Retardancy of Polymeric Materials (1998), 9, 237-244.

Murashko et al, Fire Retardant Action of Resorcinol Bis(Diphenyl Phosphate) in a PPO/HIPS Blend, Journal of Fire Sciences (1998), 16(4), 233-249.

Bright et al., "Resorcinol Bis(Diphenyl Phosphate), a Non-Halogen Flame-Retardant Additive", Recent Advances in Flame Retardancy of Polymeric Materials (1997), 8 184-191.

Nanasawa et al., "Flexural Modulus and Molecular Motion of PPE and PC by Blending Low Molecular Weight Compounds", Journal of Applied Polymer Science (1997), 66(1), 19-28.

Bright et al., "Resorcinol Bis(Diphenyl Phosphate), a Non-Halogen Flame-Retardant Additive", Annual Technical Conference-Society of Plastics Engineers (1997), $55^{th}$ (vol. 3), 2936-2940.

JP05-148403; Jun. 15, 1996; Human Translation (14 pages).
JP2000-109680; Apr. 18, 2000; Human Translation (13 pages).
JP2001-323153A; Nov. 20, 2001; Human Translation (12 pages).
JP2000-239478; Sep. 5, 2000; Human Translation (16 pages).

* cited by examiner

LOW SMOKE DENSITY POLY(ARYLENE ETHER) COMPOSITIONS, METHODS, AND ARTICLES

CROSS REFERENCE TO RELATED APPLICATIONS

This application claims priority to U.S. Provisional Application Ser. No. 60/884,335, filed Jan. 10, 2007, which is incorporated herein by reference in its entirety.

BACKGROUND OF INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and coated wire.

As plastic materials have been used in an increasing number of applications there has been an ongoing interest in decreasing their flammability through the use of flame retardants. In addition to reduced flammability it is desirable for plastic materials to produce less smoke when exposed to flames. Although flame retardant poly(arylene ether) compositions are known, it has been difficult to achieve flame retardancy in combination with low smoke generation, especially with a balance of other properties including mechanical properties. Accordingly, there is an ongoing need for poly(arylene ether) compositions that have low flammability and low smoke density.

BRIEF DESCRIPTION OF THE INVENTION

The need for a low-flammability, low-smoke poly(arylene ether) composition is addressed by a thermoplastic composition, comprising: a poly(arylene ether); a poly(alkenyl aromatic); an organophosphate ester flame retardant; a functionalized polysiloxane comprising a functional substituent selected from the group consisting of alkoxy substituents, aryloxy substituents, and aminoalkyl substituents comprising at least one primary or secondary amine; and an organic acid; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

Another embodiment is a thermoplastic composition, comprising the reaction products obtained on melt kneading: a poly(arylene ether); a poly(alkenyl aromatic); an organophosphate ester flame retardant; a functionalized polysiloxane comprising a functional substituent selected from the group consisting of alkoxy substituents, aryloxy substituents, and aminoalkyl substituents comprising at least one primary or secondary amine; and an organic acid; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

Another embodiment is a thermoplastic composition, comprising: 60 to 80 weight percent of poly(2,6-dimethyl-1,4-phenylene ether) having an intrinsic viscosity of 0.35 to 0.45 deciliter per gram, measured at 25° C. in chloroform; 5 to 15 weight percent of a rubber-modified polystyrene; 2 to 10 weight percent of a polystyrene-polybutadiene-polystyrene triblock copolymer; 5 to 15 weight percent of bisphenol A bis(diphenyl phosphate); 1.5 to 6 weight percent of a functionalized polysiloxane having the formula

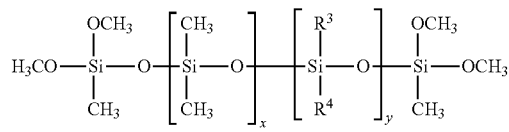

wherein each occurrence of $R^3$ is independently methyl or a 3-[(2-aminoethyl)amino]propyl group, provided that at least one occurrence of $R^3$ is a 3-[(2-aminoethyl)amino]propyl group; each occurrence of $R^4$ is independently methyl or a bridging oxygen; x is 10 to 100; and y is 1 to 10; and 0.2 to 1 weight percent of citric acid; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

Another embodiment is a thermoplastic composition, consisting of: 60 to 80 weight percent of poly(2,6-dimethyl-1,4-phenylene ether) having an intrinsic viscosity of 0.35 to 0.45 deciliter per gram, measured at 25° C. in chloroform; 5 to 15 weight percent of a rubber-modified polystyrene; 2 to 10 weight percent of a polystyrene-polybutadiene-polystyrene triblock copolymer; 5 to 15 weight percent of bisphenol A bis(diphenyl phosphate); 1.5 to 6 weight percent of a functionalized polysiloxane having the formula

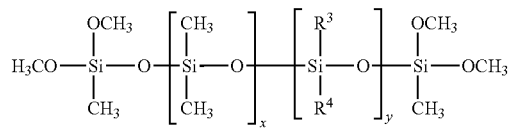

wherein each occurrence of $R^3$ is independently methyl or a 3-[(2-aminoethyl)amino]propyl group, provided that at least one occurrence of $R^3$ is a 3-[(2-aminoethyl)amino]propyl group; $R^4$ is a bridging oxygen or methyl; x is 10 to 100; and y is 1 to 10; 0.2 to 1 weight percent of citric acid; and optionally, up to 5 weight percent of an additive selected from the group consisting of stabilizers, processing aids, drip retardants, nucleating agents, dyes, pigments, antioxidants, antistatic agents, blowing agents, metal deactivators, antiblocking agents, fragrances, and combinations thereof; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

Another embodiment is a thermoplastic composition, comprising: 45 to 80 weight percent of a poly(arylene ether); 1 to 40 weight percent of a poly(alkenyl aromatic); 1 to 25 weight percent of an organophosphate ester flame retardant; and 4 to 10 weight percent of a functionalized polysiloxane comprising a functional substituent selected from the group consisting of alkoxy substituents, aryloxy substituents, and aminoalkyl substituents comprising at least one primary or secondary amine; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

Another embodiment is an article comprising a thermoplastic composition comprising: a poly(arylene ether); a poly(alkenyl aromatic); an organophosphate ester flame retardant; a functionalized polysiloxane comprising a functional substituent selected from the group consisting of alkoxy substituents, aryloxy substituents, and aminoalkyl substituents comprising at least one primary or secondary amine; and an organic acid; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

Another embodiment is an article comprising a thermoplastic composition comprising: 60 to 80 weight percent of poly(2,6-dimethyl-1,4-phenylene ether) having an intrinsic viscosity of 0.35 to 0.45 deciliter per gram, measured at 25° C. in chloroform; 5 to 15 weight percent of a rubber-modified polystyrene; 2 to 10 weight percent of a polystyrene-polybutadiene-polystyrene triblock copolymer; 5 to 15 weight percent of bisphenol A bis(diphenyl phosphate); 1.5 to 6 weight percent of a functionalized polysiloxane having the formula

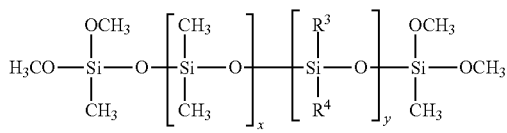

wherein each occurrence of $R^3$ is independently methyl or a 3-[(2-aminoethyl)amino]propyl group, provided that at least one occurrence of $R^3$ is a 3-[(2-aminoethyl)amino]propyl group; each occurrence of $R^4$ is independently methyl or a bridging oxygen; x is 10 to 100; and y is 1 to 10; and 0.2 to 1 weight percent of citric acid; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

Another embodiment is an article comprising a thermoplastic composition consisting of: 60 to 80 weight percent of poly(2,6-dimethyl-1,4-phenylene ether) having an intrinsic viscosity of 0.35 to 0.45 deciliter per gram, measured at 25° C. in chloroform; 5 to 15 weight percent of a rubber-modified polystyrene; 2 to 10 weight percent of a polystyrene-polybutadiene-polystyrene triblock copolymer; 5 to 15 weight percent of bisphenol A bis(diphenyl phosphate); 1.5 to 6 weight percent of a functionalized polysiloxane having the formula

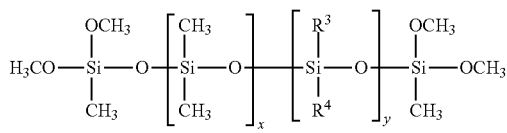

wherein each occurrence of $R^3$ is independently methyl or a 3-[(2-aminoethyl)amino]propyl group, provided that at least one occurrence of $R^3$ is a 3-[(2-aminoethyl)amino]propyl group; $R^4$ is a bridging oxygen or methyl; x is 10 to 100; and y is 1 to 10; 0.2 to 1 weight percent of citric acid; and optionally, up to 5 weight percent of an additive selected from the group consisting of stabilizers, processing aids, drip retardants, nucleating agents, dyes, pigments, antioxidants, antistatic agents, blowing agents, metal deactivators, antiblocking agents, fragrances, and combinations thereof; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

Another embodiment is a method of preparing a thermoplastic composition, comprising: melt kneading a poly(arylene ether), a poly(alkenyl aromatic), an organophosphate ester flame retardant, a functionalized polysiloxane comprising a functional substituent selected from the group consisting of alkoxy substituents, aryloxy substituents, and aminoalkyl substituents comprising at least one primary or secondary amine, and an organic acid to form a thermoplastic composition; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

Another embodiment is a method of preparing a thermoplastic composition, comprising: melt kneading 60 to 80 weight percent of poly(2,6-dimethyl-1,4-phenylene ether) having an intrinsic viscosity of 0.35 to 0.45 deciliter per gram, measured at 25° C. in chloroform, 5 to 15 weight percent of a rubber-modified polystyrene, 2 to 10 weight percent of a polystyrene-polybutadiene-polystyrene triblock copolymer, 5 to 15 weight percent of bisphenol A bis(diphenyl phosphate), 0.2 to 1 weight percent of citric acid, and 1.5 to 6 weight percent of a functionalized polysiloxane having the formula

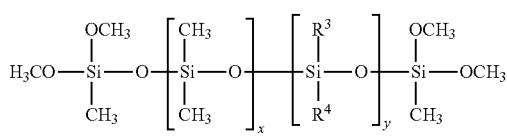

wherein each occurrence of $R^3$ is independently methyl or a 3-[(2-aminoethyl)amino]propyl group, provided that at least one occurrence of $R^3$ is a 3-[(2-aminoethyl)amino]propyl group, R⁴ is a bridging oxygen or methyl, x is 10 to 100, and y is 1 to 10 to form a thermoplastic composition; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

These and other embodiments are described in detail below.

DETAILED DESCRIPTION OF THE INVENTION

Many thermoplastic materials produce smoke when exposed to flames. Smoke can decrease visibility, which in turn can hinder evacuation and firefighting efforts. Thus thermoplastic materials that produce less smoke (have a lower smoke density) when exposed to flames during a defined period of time are desirable in a number of settings such as building interiors and vehicle interiors.

Smoke density can be described by either the density of smoke at a specified time after exposure to flame or by the maximum smoke density produced after exposure to flame during a specified period of time (described herein as the initial 20 minutes). Smoke density is determined by optical methods. A lower value for smoke density indicates that less smoke was produced. Lower smoke values are therefore more desirable. The density of smoke at a specified time is an indicator of how quickly smoke develops after the composition is exposed to a flame. The maximum smoke density indicates a maximum quantity of smoke produced during a specified period of time (for example, in the initial 20 minutes after ignition). In some applications it is particularly desirable for the smoke density at a specified time to be low. In some applications it is desirable to have a low maximum smoke density. In some applications both measures of smoke density are important.

There are various methods to measure the smoke density of the material—both static and dynamic methods. These test methods vary in the sample size, shape, orientation of the sample during the test, ignition source, quantity of heat energy, type of detectors, and ventilation. Unlike static test methods like ASTM E662, UIC 564-2, 3 m cube smoke chamber test, XP2 smoke chamber test, dynamic test methods like ASTM E 84, Cone calorimeter, ISO 92329-1, and ISO 5660-2 use ventilated conditions. The material can be tested in all these test methods and may lead to reduced smoke generation in these tests method as well. For the working examples of this application, the test methods of ASTM E662 were used.

The thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters. The thermoplastic composition can exhibit both of these smoke density properties. In some embodiments, the thermoplastic composition described herein has a smoke density at four minutes of 5 to 250 as determined by ASTM E662 using samples having a thickness of 1.5 to 3.2 millimeters (mm), specifically a thickness of 3.2 mm. Within this range the smoke density at four minutes can be less than or equal to 200, specifically less than or equal to 150, more specifically less than or equal to 100. Low smoke densities are harder to achieve at higher thicknesses. It is therefore desirable to achieve a given smoke density at a higher thickness.

In some embodiments, the thermoplastic composition has a maximum smoke density of 20 to 300 in the initial 20 minutes after ignition as determined by ASTM E662 using samples having a thickness of 1.5 to 3.2 mm, specifically a thickness of 3.2 mm. Within this range and time the maximum smoke density can be less than or equal to 200, specifically less than or equal to 180, more specifically less than or equal to 150.

As mentioned above, flammability can also be an important property of thermoplastic compositions. One objective measure of flammability is the "20 mm Vertical Burning Test" of Underwriter's Laboratory Bulletin 94, entitled "Tests for Flammability of Plastic Materials for Parts in Devices and Appliances; UL 94", 5$^{th}$ edition, revised in 200 (hereinafter "UL 94"). In some embodiments, the thermoplastic composition has a UL 94 rating of V-1 or V-0 when tested at a thickness of 1.6 to 3.2 millimeters, specifically 1.0 to 1.6 millimeters. In some embodiments, the thermoplastic composition has a UL 94 rating V-0 at a thickness of 1.6 to 3.2 millimeters, specifically 1.0 to 1.6 millimeters.

Low smoke density, low flammability and combinations thereof can be difficult to achieve, particularly with a minimal loss of other physical properties such as impact strength. However, the thermoplastic composition is capable of exhibiting very high impact strengths. For example, in some embodiments, the thermoplastic composition has a notched Izod impact strength of at least 180 Joules per meter (J/m), measured at 23° C. according to ASTM D256. As shown in the working examples below, notched Izod impact strengths as high as about 350 J/m have been demonstrated. Notched Izod impact strength can also be measured according to ISO 180/1A, in which case it is expressed in units of kilojoules per square-meter (kJ/m²).

The thermoplastic composition comprises a poly(arylene ether), a poly(alkenyl aromatic), an organophosphate ester flame retardant, a functionalized polysiloxane, and an organic acid. Poly(arylene ether)s useful in the present compositions comprise repeating arylene ether units of the formula

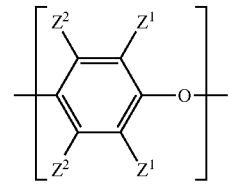

wherein for each structural unit, each $Z^1$ is independently halogen, unsubstituted or substituted $C_1$-$C_{12}$ hydrocarbyl provided that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. However, when the hydrocarbyl residue is described as "substituted", may contain heteroatoms over and above the carbon and hydrogen members of the substituent residue. Thus, when specifically described as substituted, the hydrocarbyl residue may also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxy groups, alkoxy groups, or the like, and it may contain heteroatoms within the backbone of the hydrocarbyl residue.

The poly(arylene ether) can comprise molecules having one or more aminoalkyl-containing end groups, typically located in an ortho position to the hydroxy group. Also frequently present are tetramethyldiphenoquinone (TMDQ) end groups, typically obtained from reaction mixtures in which tetramethyldiphenoquinone by-product is present.

the viscosity of the poly(arylene ether) may be up to 30% higher after melt kneading. The percentage of increase can be calculated as 100×(final intrinsic viscosity−initial intrinsic viscosity)/initial intrinsic viscosity. Determining an exact ratio, when two intrinsic viscosities are used, will depend somewhat on the exact intrinsic viscosities of the poly (arylene ether) used and the ultimate physical properties that are desired.

In some embodiments the poly(arylene ether) comprises a bifunctional poly(arylene ether). With respect to an individual poly(arylene ether) molecule, the term "bifunctional" means that the molecule comprises two phenolic hydroxy groups. With respect to a poly(arylene ether) resin, the term "bifunctional" means that the resin comprises, on average, 1.6 to 2.4 phenolic hydroxy groups per poly(arylene ether) molecule. In some embodiments, the bifunctional poly (arylene ether) comprises, on average, 1.8 to 2.2 phenolic hydroxy groups per poly(arylene ether) molecule.

In some embodiments, the bifunctional poly(arylene ether) has the formula

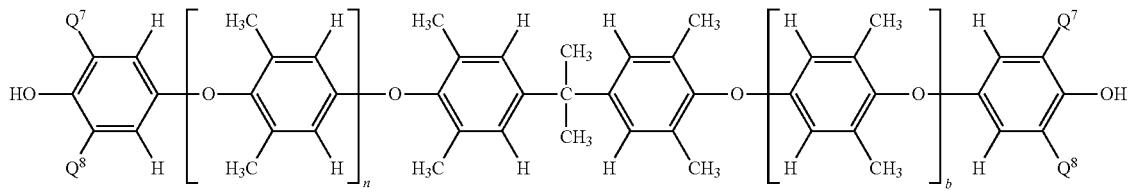

The poly(arylene ether) can be in the form of a homopolymer, a copolymer, a graft copolymer, an ionomer, or a block copolymer, as well as combinations comprising at least one of the foregoing. Poly(arylene ether)s include polyphenylene ethers comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing. In some embodiments, the poly(arylene ether) comprises poly(2,6-dimethyl-1,4-phenylene ether) or poly(2,6-dimethyl-1,4-phenylene ether-co-2,3,6-trimethyl-1,4-phenylene ether).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C., and samples having a concentration of 1 milligram per milliliter of chloroform. The poly(arylene ether) or combination of poly(arylene ether)s can have an initial intrinsic viscosity of 0.25 to 0.60 deciliters per gram (dl/g), as measured in chloroform at 25° C. The initial intrinsic viscosity can be 0.3 to 0.55 dl/g, specifically 0.35 to 0.45 dl/g. Initial intrinsic viscosity is defined as the intrinsic viscosity of the poly(arylene ether) prior to melt kneading with the other components of the composition. Final intrinsic viscosity is defined as the intrinsic viscosity of the poly(arylene ether) after melt kneading with the other components of the composition. As understood by one of ordinary skill in the art wherein each occurrence of $Q^7$ and $Q^8$ is independently methyl or di-n-butylaminomethyl; and each occurrence of a and b is independently 0 to 200, provided that the sum of a and b is about 150 to 200. Bifunctional poly(arylene ether)s having this structure can be synthesized by oxidative copolymerization of 2,6-xylenol and 2,2-bis(3,5-dimethyl-4-hydroxyphenyl)propane in the presence of a catalyst comprising di-n-butylamine.

The bifunctional poly(arylene ether) can be prepared by a process comprising oxidatively polymerizing a monohydric phenol in the presence of a catalyst under conditions suitable to form a corresponding poly(arylene ether) and a corresponding diphenoquinone; separating the poly(arylene ether) and the diphenoquinone from the catalyst; and equilibrating the poly(arylene ether) and the diphenoquinone to form a poly(arylene ether) having two terminal hydroxy groups. An illustrative example of a corresponding poly(arylene ether) is poly(2,6-dimethyl-1,4-phenylene ether) prepared from oxidative polymerization of 2,6-dimethylphenol. An illustrative example of a corresponding diphenoquinone is 3,3',5,5'-tetramethyl-4,4'-diphenoquinone formed by oxidation of 2,6-dimethylphenol.

The bifunctional poly(arylene ether) can also be prepared by a redistribution reaction in which a monofunctional poly (arylene ether) is equilibrated with a dihydric phenol, optionally in the presence of an oxidizing agent. Redistribution reactions are known in the art and described, for example, in U.S. Pat. No. 3,496,236 to Cooper et al. and U.S. Pat. No. 5,880,221 to Liska et al.

The composition comprises poly(arylene ether) in an amount of 40 to 97 weight percent, based on the total weight of the thermoplastic composition. Specifically, the poly (arylene ether) amount can be 50 to 85 weight percent, more specifically 60 to 80 weight percent.

In addition to the poly(arylene ether), the thermoplastic composition comprises a poly(alkenyl aromatic). The term "poly(alkenyl aromatic)" as used herein includes polymers prepared by methods known in the art including bulk, suspension, and emulsion polymerization, which contain at least 25% by weight of structural units derived from polymerization of an alkenyl aromatic monomer of the formula

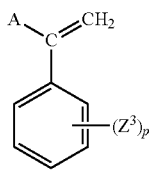

wherein A is hydrogen, $C_1$-$C_8$ alkyl, or halogen; each occurrence of $Z^3$ is vinyl, halogen or $C_1$-$C_8$ alkyl; and p is 0, 1, 2, 3, 4, or 5. Exemplary alkenyl aromatic monomers include styrene, alpha-methylstyrene, para-methylstyrene, para-t-butylstyrene, chlorostyrenes, and vinyltoluenes. The poly(alkenyl aromatic)s include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer, wherein the rubber modifier may be a polymerization product of at least one $C_4$-$C_{10}$ non-aromatic diene monomer, such as butadiene or isoprene, and wherein the rubber-modified poly(alkenyl aromatic) resin comprises 98 to 70 weight percent of the homopolymer of an alkenyl aromatic monomer and 2 to 30 weight percent of the rubber modifier, specifically 88 to 94 weight percent of the homopolymer of an alkenyl aromatic monomer and 6 to 12 weight percent of the rubber modifier. An exemplary rubber-modified poly(alkenyl aromatic) is a rubber-modified polystyrene, also known as high-impact polystyrene or HIPS, comprising 88 to 94 weight percent polystyrene and 6 to 12 weight percent polybutadiene. These rubber-modified polystyrenes are commercially available as, for example, GEH 1897 from GE Plastics, and BA 5350 from Chevron.

The stereoregularity of the poly(alkenyl aromatic) may be atactic or syndiotactic. Exemplary poly(alkenyl aromatic)s include atactic and syndiotactic homopolystyrenes. Suitable atactic homopolystyrenes are commercially available as, for example, EB3300 from Chevron, and P1800 from BASF.

The composition comprises the poly(alkenyl aromatic) in an amount of 1 to 60 weight percent, specifically 2 to 40 weight percent, more specifically 5 to 15 weight percent, based on the total weight of the thermoplastic composition. In some embodiments the weight ratio of poly(arylene ether) to poly(alkenyl aromatic) is 40:60 to 99:1, specifically 70:30 to 85:15.

In addition to the poly(arylene ether) and the poly(alkenyl aromatic), the thermoplastic composition comprises an organophosphate ester flame retardant. Exemplary organophosphate ester flame retardants useful in the thermoplastic composition include phosphate esters comprising phenyl groups, substituted phenyl groups, or a combination of phenyl groups and substituted phenyl groups; bis(aryl phosphate) esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl)phosphate (for example, CAS Reg. No. 89492-23-9 or CAS Reg. No. 78-33-1), resorcinol bis(diphenyl phosphate) (for example, CAS Reg. No. 57583-54-7), bisphenol A bis(diphenyl phosphate) (for example, CAS Reg. No. 181028-79-5), triphenyl phosphate (CAS Reg. No. 115-86-6), tris(isopropylphenyl)phosphate (for example, CAS Reg. No. 68937-41-7), and mixtures of two or more of the foregoing organophosphate esters.

In some embodiments the organophosphate ester comprises a bis(aryl phosphate) of the formula

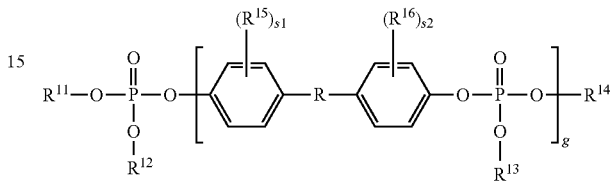

wherein R is independently at each occurrence $C_1$-$C_{12}$ alkylidene, specifically isopropylidene; $R^{11}$, $R^{12}$, $R^{13}$, and $R^{14}$ are independently at each occurrence $C_1$-$C_{12}$ hydrocarbyl; $R^{15}$ and $R^{16}$ are independently at each occurrence $C_1$-$C_5$ alkyl group; g is 1 to 25; and s1 and s2 are independently at each occurrence 0, 1, or 2. In some embodiments $OR^{11}$, $OR^{12}$, $OR^{13}$ and $OR^{14}$ are independently derived from phenol, a monoalkylphenol, a dialkylphenol, or a trialkylphenol.

As readily appreciated by one skilled in the art, the bis(aryl phosphate) is derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane, and 1,1-bis(4-hydroxyphenyl)ethane. In some embodiments, the bisphenol is bisphenol A.

Organophosphate esters can have differing molecular weights making the determination of the amount of different organophosphate esters used in the thermoplastic composition difficult. The amount of organophosphate ester can therefore be specified in terms of the associated amount of elemental phosphorus, which can be 0.1 weight percent to 2.5 weight percent with respect to the total weight of the thermoplastic composition. Alternatively, the amount of organophosphate ester flame retardant can be specified as the weight percent of the entire organophosphate ester, which can be 1 to 25 weight percent, based on the total weight of the thermoplastic composition. Specifically, the organophosphate ester flame retardant amount can be 2 to 20 weight percent, more specifically 5 to 15 weight percent.

In addition to the poly(arylene ether), the poly(alkenyl aromatic), and the organophosphate ester flame retardant, the thermoplastic composition comprises a functionalized polysiloxane. The functionalized polysiloxane comprises at least one functional substituent selected from alkoxy substituents, aryloxy substituents, and aminoalkyl substituents containing at least one primary or secondary amine. It will be understood that the functionalized polysiloxane can comprise multiple functional substituents, in which case each functional substituent is independently selected from alkoxy substituents, aryloxy substituents, and aminoalkyl substituents containing at least one primary or secondary amine. It is also possible to use mixtures of two or more functionalized polysiloxanes having different functional groups. For example, it is possible to use a mixture comprising a methoxy-substituted polysiloxane and an amine-substituted polysiloxane, particularly such a mixture having a viscosity of about 10 to 50 centistokes.

Useful functionalized polysiloxanes in the present invention include those having the formula

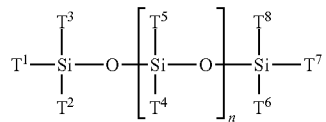

wherein each occurrence of $T^1$, $T^2$, $T^3$, $T^4$, $T^5$, $T^6$, $T^7$, and $T^8$ is independently a $C_1$-$C_5$ alkyl substituent, a $C_1$-$C_5$ alkoxy substituent, an aryloxy substituent, or a $C_1$-$C_{10}$ aminoalkyl substituent comprising at least one primary or secondary amine, provided that at least one occurrence of $T^1$, $T^2$, $T^3$, $T^4$, $T^5$, $T^6$, $T^7$, or $T^8$ is a $C_1$-$C_5$ alkoxy substituent, an aryloxy substituent, or a $C_1$-$C_{10}$ aminoalkyl substituent comprising at least one primary or secondary amine; and n is 10 to 100. In some embodiments, at least one of $T^1$ and $T^8$ is a $C_1$-$C_5$ alkoxy substituent. In some embodiments, the functionalized polysiloxane comprises a $C_1$-$C_{10}$ aminoalkyl group comprising a primary or secondary amine. Specifically, the aminoalkyl group can be a 3-[(2-aminoethyl)amino]propyl group, which has the structure

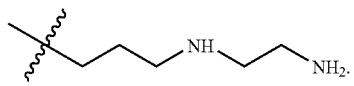

where the wavy line at the left end of the structure indicates the point of attachment to the polysiloxane backbone. In some embodiments, at least one of $T^1$ and $T^8$ is a $C_1$-$C_5$ alkoxy substituent and at least 50% of at least one of $T^2$ and $T^7$ is a $C_1$-$C_5$ alkoxy substituent. In some embodiments, $T^1$, $T^2$, $T^7$ and $T^8$ are $C_1$-$C_5$ alkoxy substituents, specifically methoxy or ethoxy. In some embodiments, $T^1$ and $T^8$ are methoxy substituents and at least 50% of $T^2$ and $T^7$ are methoxy substituents. In some embodiments, the combined average number of $C_1$-$C_5$ alkoxy substituents for $T^1$, $T^2$, $T^3$, $T^4$, $T^5$, $T^6$, $T^7$, and $T^8$ is 1 to 20, specifically 1 to 10, per polysiloxane molecule. In some embodiments, at least 75% of the $T^1$, $T^2$, $T^3$, $T^4$, $T^5$, $T^6$, $T^7$, and $T^8$ substituents are $C_1$-$C_5$ alkyl substituents, specifically methyl.

The functionalized polysiloxane can have the formula

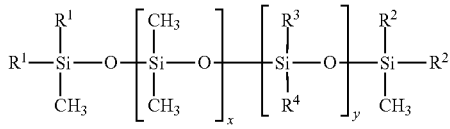

wherein each occurrence of $R^1$ and $R^2$ is independently a $C_1$-$C_5$ alkoxy substituent; $R^3$ is a $C_1$-$C_5$ alkyl or a $C_1$-$C_{10}$ aminoalkyl group comprising a primary amine or a secondary amine, provided that at least one occurrence of $R^3$ is a $C_1$-$C_{10}$ aminoalkyl group comprising a primary amine or a secondary amine; each occurrence of $R^4$ is a $C_1$-$C_5$ alkyl substituent or a bridging oxygen; x is 10 to 100; and y is 1 to 25. As used herein, the term "bridging oxygen" refers to an oxygen atom that links the polysiloxane molecule shown to another polysiloxane molecule by bridging two silicon atoms. In some embodiments, at least one occurrence of $R^3$ is 3-[(2-aminoethyl)amino]propyl. In some embodiments, each occurrence of $R^1$ and $R^2$ is methoxy; each occurrence of $R^3$ is independently methyl or 3-[(2-aminoethyl)amino]propyl, provided that at least one occurrence of $R^3$ is 3-[(2-aminoethyl)amino]propyl; $R^4$ is a bridging oxygen or methyl; x is 10 to 100; and y is 1 to 10.

The functionalized polysiloxane can, optionally, have a viscosity at 23° C. of 10 to 200 centistokes, specifically 10 to 150 centistokes, more specifically 10 to 100 centistokes.

Functionalized polysiloxanes comprising an alkoxy substituent, an aryloxy substituent, or a combination of alkoxy and aryloxy substituents are known in the arts and are commonly used in room temperature vulcanizing (RTV) silicone rubber compositions. Methods for the preparation of useful functionalized polysiloxanes are also widely known. One exemplary method involves reaction of a halogen-substituted polysiloxane with an alcohol in the presence of a hydrogen halide acceptor, such as pyridine, alpha-picoline, or other tertiary amine. These reactions typically occur at room temperature and are preferably carried out under anhydrous conditions. A wide variety of alcohols can be used to prepare the functionalized polysiloxanes, but the use of methanol and ethanol to form methoxy- and ethoxy-substituted polydimethylsiloxanes, respectively, is sometimes preferred.

Polyalkoxy terminated polysiloxanes may also be prepared in a static mixer by reacting a silanol end-stopped diorganopolysiloxane, e.g., a silanol end-stopped dimethylpolysiloxane, with methyl trimethoxy silane along with known endcapping catalysts. Functional polysiloxanes containing amino groups are known. They may be prepared, for example, by reacting the aminoalkyltrialkoxysilane with hydroxy-terminated polydimethylsiloxanes or by equilibration of octamethylcyclotetrasiloxane with amino-functional siloxanes using a basic equilibration catalyst such as potassium hydroxide. These and other methods for preparing functionalized polysiloxanes can be found in U.S. Pat. No. 2,909,549 to Bailey, U.S. Pat. No. 4,528,324 to Chung et al., U.S. Pat. No. 4,731,411 to Lucas, U.S. Pat. No. 5,925,779 to Cray et al., U.S. Pat. No. 6,258,968 to Eversheim et al., and U.S. Pat. No. 6,482,912 to Boudjouk et al.

Suitable functionalized polysiloxanes include those commercially available under the tradenames GAP-10, 89124, SF1705, SF1706, SF1708, SF1921, SF1922, SF1923, SF1925, 88918, SF1927, 89089; AC3309, OF7747, AI3640, AC3631, AL3683, AC3418, AC3545, AM3635, TSF4702, TSF4703, TSF4704, TSF4705, TSF4706, TSF4707, TSF4708, TP3635 and TSF4709, all from Momentive Performance Materials, Inc.

In some embodiments, the composition comprises the functionalized polysiloxane in an amount of about 0.1 to 10 weight percent, based on the total weight of the thermoplastic composition. Specifically, the functionalized polysiloxane amount can be about 0.5 to 8 weight percent, more specifically about 1.5 to 6 weight percent.

In addition to the poly(arylene ether), the poly(alkenyl aromatic), the organophosphate ester flame retardants, and the functionalized polysiloxane, the thermoplastic composition comprises an organic acid. The organic acids useful in the present compositions include a broad class of organic compounds having acidic properties. Especially useful organic acids are the carboxylic acids, which are organic compounds comprising at least one carboxylic acid group. The organic acids can have one, two, or even more carboxylic acid groups per molecule. Other functional substituents, e.g., hydroxyl, ether, and olefinic unsaturation, may also be present. Examples of organic acids include $C_3$-$C_{20}$ aliphatic monocarboxylic acids, $C_3$-$C_{20}$ aliphatic polycarboxylic acids (including aliphatic dicarboxylic acids), and aromatic carboxylic acids. Specific illustrative organic acids include stearic acid, butanoic acid, maleic acid, fumaric acid, phthalic acids, benzoic acid, itaconic acid, aconitic acid; unsaturated dicarboxylic acids (such as acrylic acid, butenoic acid, methacrylic acid, pentenoic acid, decenoic acids, undecenoic acids, dodecenoic acids, linoleic acid, etc.), citric acid, malic acid, agaricic acid, lactic acid, glyceric acid, oxalic acid, malonic acid, succinic acid, glutaric acid, adipic acid, tartaric acid, glycolic acid, thioglycolic acid, acetic acid, halogenated acetic acids (such as monochloroacetic acid, dichloroacetic acid, and trichloroacetic acid), propionic acid, gluconic acid, ascorbic acid, anhydrides of the foregoing, and mixtures thereof.

Suitable organic acids further include poly(arylene ether)s comprising at least one carboxylic acid group. Such poly(arylene ether)s can be prepared, for example, by melt kneading a poly(arylene ether) with an organic acid or anhydride such as citric acid, fumaric acid, maleic acid, or maleic anhydride. Suitable organic acids also include polyolefins comprising at least one carboxylic acid group. Such polyolefins can be prepared, for example, by grafting polyolefins with suitable acids or anhydrides, optionally in the presence of a free radical initiator, such as a peroxide. Many polyolefins comprising at least one carboxylic acid group are commercially available.

The anhydrous and hydrated acids as well as derivates such as the salts thereof, including the salts made by combining the organic acids with various amines, are also useful in various embodiments.

The organic acids can have differing molecular weights and differing numbers of carboxylic acids groups per molecule making it difficult to generalize about the amount of organic acid to be used in the thermoplastic composition. However, the organic acid amount is typically 0.05 to 10 weight percent, based on the total weight of the thermoplastic composition. Specifically, the organic acid amount can be 0.05 to 5 weight percent, more specifically 0.1 to 2 weight percent, still more specifically 0.2 to 1 weigh percent.

In addition to the required components described above, the thermoplastic composition can comprise various optional components. One optional component is a block copolymer. The block copolymer comprises a block (A) comprising repeating aryl alkylene units and a block (B) comprising repeating alkylene units, repeating alkene units, or a combination thereof. The repeating alkylene units comprise 2 to 15 carbons. The repeating alkene units comprise 2 to 15 carbons. The arrangement of blocks (A) and (B) may be a linear structure, tapered structure, or a so-called radial teleblock structure having branched chains. A-B-A triblock copolymers have two blocks (A) comprising repeating aryl alkylene units. A-B diblock copolymers have one block (A) comprising repeating aryl alkylene units. The pendant aryl moiety of the aryl alkylene units may be monocyclic or polycyclic and may have a substituent at any available position on the cyclic portion. For example, the aryl alkylene unit may have the structure

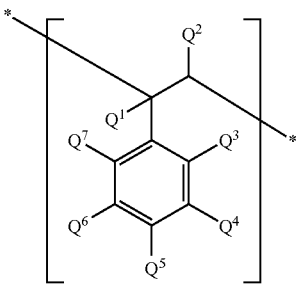

wherein $Q^1$ and $Q^2$ each independently represent a hydrogen atom, a $C_1$-$C_8$ alkyl group, or a $C_2$-$C_8$ alkenyl group; $Q^3$ and $Q^7$ each independently represent a hydrogen atom, or a $C_1$-$C_8$ alkyl group; and $Q^4$, $Q^5$, and $Q^6$ each independently represent a hydrogen atom, a $C_1$-$C_8$ alkyl group, or a $C_2$-$C_8$ alkenyl group, or $Q^3$ and $Q^4$ are taken together with the central aromatic ring to form a naphthyl group, or $Q^4$ and $Q^5$ are taken together with the central aromatic ring to form a naphthyl group. Specific alkenyl aromatic monomers include, for example, styrene, methylstyrenes such as alpha-methylstyrene and p-methylstyrene, and p-t-butylstyrene. An exemplary aryl alkylene unit is phenylethylene, which is formed by the polymerization of styrene and is shown in the formula below

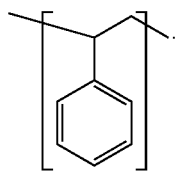

Block (A) may further comprise alkylene units having 2 to 15 carbons or alkene units having 2 to 15 carbons or a combination thereof as long as the weight percent of aryl alkylene units exceeds the weight percent sum of alkylene units and/or alkene units. Each occurrence of block (A) may have a molecular weight which is the same or different than other occurrences of block (A).

In some embodiments block (B) comprises repeating alkylene units having 2 to 15 carbons such as ethylene, propylene, butylene, or combinations of two or more of the foregoing. Block (B) may further comprise aryl alkylene units as long as the weight percent of alkylene units exceeds the weight percent of aryl alkylene units. The block (B) repeating units are derived from the polymerization of dienes such as butadiene or isoprene and, optionally, subsequent hydrogenation to partially or fully reduce the (aliphatic) unsaturation. Each occurrence of block (B) may have a molecular weight which is the same or different than other occurrences of block (B).

In some embodiments block (B) comprises repeating alkene units having 2 to 15 carbons. Block (B) may further comprise aryl alkylene units as long as the quantity of alkene units exceeds the quantity of aryl alkylene units. The block (B) repeating units are derived from the polymerization of dienes such as butadiene or isoprene. Each occurrence of block (B) may have a molecular weight which is the same or different than other occurrences of block (B).

Suitable A-B and A-B-A copolymers include, for example, polystyrene-polybutadiene (SB), polystyrene-poly(ethylene-propylene) (SEP), polystyrene-polyisoprene (SI), poly(α-methylstyrene)-polybutadiene, polystyrene-polybutadiene-polystyrene (SBS), polystyrene-poly(ethylene-propylene)-polystyrene (SEPS), polystyrene-poly(ethylene-butylene)-polystyrene (SEBS), polystyrene-polyisoprene-polystyrene (SIS), and poly(alpha-methylstyrene)-polybutadiene-poly(alpha-methylstyrene), as well as the selectively hydrogenated versions thereof, and the like. Mixtures of the aforementioned block copolymers are also useful. Such A-B and A-B-A block copolymers are available commercially from a number of sources, including Phillips Petroleum under the tradename SOLPRENE, Kraton Polymers under the tradename KRATON, Dexco under the tradename VECTOR, Total Petrochemical under the tradename FINACLEAR, and Kuraray under the tradename SEPTON. In some embodiments the block copolymer is non-hydrogenated. Exemplary non-hydrogenated block copolymers include polystyrene-polybutadiene, polystyrene-polyisoprene, poly(α-methylstyrene)-polybutadiene, polystyrene-polybutadiene-polystyrene (SBS), polystyrene-polyisoprene-polystyrene and poly(alpha-methylstyrene)-polybutadiene-poly(alpha-methylstyrene). The use of a non-hydrogenated block copolymer can result in a smoke density (maximum, at four minutes, or both) less than the smoke density of comparable compositions comprising a hydrogenated block copolymer. In some embodiments in which the thermoplastic composition comprises a non-hydrogenated block copolymer, the composition excludes hydrogenated block copolymer.

When present in the thermoplastic composition, the block copolymer can be used in an amount of 1 to 20 weight percent, based on the total weight of the thermoplastic composition. Specifically, the block copolymer amount can be 2 to 10 weight percent, more specifically 3 to 8 weight percent.

Another optional component is a mold release agent comprising a hydrogenated hydrocarbon resin. The hydrogenated hydrocarbon resin can have a weight average molecular weight of 500 to 2000 atomic mass units. Such hydrogenated hydrocarbon resins are commercially available from Arakawa under the tradename ARKON. The inclusion of a hydrogenated hydrocarbon resin in the composition can decrease the melt viscosity of the composition relative to comparable compositions without hydrogenated hydrocarbon resin. The hydrogenated hydrocarbon resin can be present in an amount of 2 to 8 weight percent, based on the total weight of the thermoplastic composition. When present in amounts greater than 8 weight percent the smoke density of the composition can increase relative to compositions containing less than 8 weight percent hydrogenated hydrocarbon resin. Compositions containing at least 2 weight percent of hydrogenated hydrocarbon resin in some embodiments have reduced melt viscosity versus comparable compositions without the hydrogenated hydrocarbon resin. It is unexpected that compositions containing the hydrogenated hydrocarbon resin within the range 2 to 8 weight percent can still have acceptably low maximum smoke densities. These results are especially unexpected since addition of 2 weight percent polyethylene typically results in significantly higher maximum smoke densities.

Another optional component is a polyolefin in an amount of 0.1 to 3 weight percent, based on the total weight of the composition. Specifically, the polyolefin amount can be 0.2 to 2 weight percent, more specifically 0.3 to 1 weight percent. As demonstrated in the working examples below, too much polyolefin can detract from the desirable smoke density properties of the thermoplastic composition. However, a small amount of a polyolefin can be useful as a mold release agent without detracting from the desirable properties of the thermoplastic composition. Polyolefins are polymers of the general structure: $C_nH_{2n}$ and include polyethylene, polypropylene, and polyisobutylene. Exemplary homopolymers include polyethylene, high density polyethylene (HDPE), medium density polyethylene (MDPE), and isotactic polypropylene. Polyolefin resins of this general structure and methods for their preparation are well known in the art. The polyolefin may also be an olefin copolymer. Such copolymers include copolymers of ethylene and alpha olefins like octene, propylene and 4-methylpentene-1 as well as copolymers of ethylene and one or more rubbers and copolymers of propylene and one or more rubbers. Copolymers of ethylene and $C_3$-$C_{10}$ monoolefins and non-conjugated dienes, herein referred to as EPDM copolymers, are also suitable. Examples of suitable $C_3$-$C_{10}$ monoolefins for EPDM copolymers include propylene, 1-butene, 2-butene, 1-pentene, 2-pentene, 1-hexene, 2-hexene, 3-hexene, and the like. Suitable dienes include 1,4-hexadiene and monocylic and polycyclic dienes. Mole ratios of ethylene to other $C_3$-$C_{10}$ monoolefin monomers can range from 95:5 to 5:95 with diene units being present in the amount of from 0.1 to 10 mole percent. EPDM copolymers can be functionalized with an acyl group or electrophilic group for grafting onto the polyphenylene ether as disclosed in U.S. Pat. No. 5,258,455 to Laughner et al. Olefin copolymers further comprise linear low density polyethylene (LLDPE).

The composition can, optionally, further comprise up to 5 weight percent total of various thermoplastic additives known in the art, including fillers, reinforcing agents, mold release agents, stabilizers, processing aids, drip retardants, nucleating agents, dyes, pigments, antioxidants, anti-static agents, blowing agents, metal deactivators, antiblocking agents, fragrances, and combinations thereof. The total amount of such additives is typically no more than 5 weight percent, based on the total weight of the thermoplastic composition.

In some embodiments, the composition may exclude or be substantially free of components other than those described above as required or optional. For example, the composition may be substantially free of other thermoplastic materials, such as polyamides, polyesters, polyarylates, polyetherimides, polycarbonates, and polyolefins. As used herein, the term "substantially free" means that the composition comprises less than 0.5 weight percent of the specified component based on the total weight of the thermoplastic composition. More specifically, the composition may comprise less than 0.1 weight percent of the specified component, or none of the specified component may be intentionally added.

One embodiment is a thermoplastic composition, comprising: 60 to 80 weight percent of poly(2,6-dimethyl-1,4-phenylene ether) having an intrinsic viscosity of 0.35 to 0.45 deciliter per gram, measured at 25° C. in chloroform; 5 to 15 weight percent of a rubber-modified polystyrene; 2 to 10 weight percent of a polystyrene-polybutadiene-polystyrene triblock copolymer; 5 to 15 weight percent of bisphenol A bis(diphenyl phosphate); 1.5 to 6 weight percent of a functionalized polysiloxane having the formula

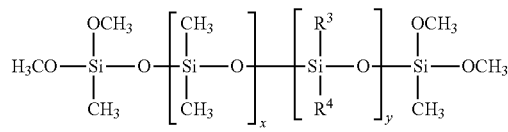

wherein each occurrence of $R^3$ is independently methyl or a 3-[(2-aminoethyl)amino]propyl group, provided that at least one occurrence of $R^3$ is a 3-[(2-aminoethyl)amino]propyl group; each occurrence of $R^4$ is independently methyl or a bridging oxygen; x is 10 to 100; and y is 1 to 10; and 0.2 to 1 weight percent of citric acid; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 millimeters. The thermoplastic composition can also have a notched Izod impact strength of 180 to 350 Joules per meter measured at 23° C. according ASTM D256.

Another embodiment is a thermoplastic composition, consisting of: 60 to 80 weight percent of poly(2,6-dimethyl-1,4-phenylene ether) having an intrinsic viscosity of 0.35 to 0.45 deciliter per gram, measured at 25° C. in chloroform; 5 to 15 weight percent of a rubber-modified polystyrene; 2 to 10 weight percent of a polystyrene-polybutadiene-polystyrene triblock copolymer; 5 to 15 weight percent of bisphenol A bis(diphenyl phosphate); 1.5 to 6 weight percent of a functionalized polysiloxane having the formula

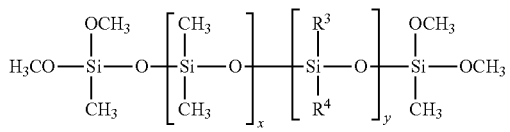

wherein each occurrence of $R^3$ is independently methyl or a 3-[(2-aminoethyl)amino]propyl group, provided that at least one occurrence of $R^3$ is a 3-[(2-aminoethyl)amino]propyl group; $R^4$ is a bridging oxygen or methyl; x is 10 to 100; and y is 1 to 10; 0.2 to 1 weight percent of citric acid; and optionally, up to 5 weight percent of an additive selected from the group consisting of stabilizers, processing aids, drip retardants, nucleating agents, dyes, pigments, antioxidants, antistatic agents, blowing agents, metal deactivators, antiblocking agents, fragrances, and combinations thereof; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 millimeters. The thermoplastic composition can have a notched Izod impact strength of 180 to 350 Joules per meter measured at 23° C. according ASTM D256.

Another embodiment is a thermoplastic composition, comprising: 45 to 80 weight percent, specifically 50 to 80 weight percent, of a poly(arylene ether); 1 to 40 weight percent of a poly(alkenyl aromatic); 1 to 25 weight percent of an organophosphate ester flame retardant; and 4 to 10 weight percent of a functionalized polysiloxane comprising a functional substituent selected from the group consisting of alkoxy substituents, aryloxy substituents, and aminoalkyl substituents comprising at least one primary or secondary amine; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters. Note that this composition does not require an organic acid. This reflects the present inventors' observation that an excellent balance of flammability, smoke density, and physical properties can be achieved even without use of an organic acid if the poly(arylene ether) amount is at least 45 weight percent, and the functionalized polysiloxane amount is at least 4 weight percent. Components taught as optional for the organic acid-containing thermoplastic composition can be used in this thermoplastic composition.

The invention also extends to articles comprising any of the above-described compositions. The composition is particularly suitable for the fabrication of articles useful in transportation and building and construction industries. Transportation applications include interior trim and structural articles in airplanes, train cars and vehicles (cars, recreational vehicles, and trucks). Building applications include wiring conduits, furniture, office partitions, and the like. Articles can be prepared using thermoplastic processing techniques known in the art, including film and sheet extrusion, injection molding, blow molding, and compression molding.

Those skilled in the art appreciate that the components used to form the thermoplastic composition can react under the melt kneading conditions used to form the thermoplastic composition. In particular, the organic acid and the functionalized polysiloxane are likely to react with other components during melt kneading. The invention therefore extends to the reaction products formed during melt kneading. Thus, one embodiment is a thermoplastic composition, comprising the reaction products obtained on melt kneading: a poly(arylene ether); a poly(alkenyl aromatic); an organophosphate ester flame retardant; a functionalized polysiloxane comprising a functional substituent selected from the group consisting of alkoxy substituents, aryloxy substituents, and aminoalkyl substituents comprising at least one primary or secondary amine; and an organic acid; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

The invention includes methods of preparing the thermoplastic composition. Thus, one embodiment is a method of preparing a thermoplastic composition, comprising: melt kneading a poly(arylene ether), a poly(alkenyl aromatic), an organophosphate ester flame retardant, an organic acid, and a functionalized polysiloxane comprising a functional substituent selected from the group consisting of alkoxy substituents and aryloxy substituents and aminoalkyl substituents comprising at least one primary or secondary amine to form a thermoplastic composition; wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters. In some embodiments, the melt kneading is conducted on an extruder comprising a vacuum vent in the downstream one third of the extruder, where the vacuum vent is maintained at a vacuum of 30 to 76 centimeters of mercury. One can determine whether the vacuum vent is in the "downstream one third of the extruder" by defining the full length of the extruder as running along the axis of the extruder screw from the midpoint of the feed throat to the outer surface of the die, dividing the full length of the extruder into three equal segments, and determining whether the center of the vent occurs within the downstream one third of the extruder that terminates with the outer surface of the die. A vacuum of 30 to 76 centimeters of mercury corresponds to an absolute pressure of 0 to 0.61 atmosphere, or 0 to 61 kilopascals. The present inventors have observed that the use of vacuum during the processing significantly and unexpectedly reduces the smoke density of the resulting composition. vacuum less than 50 centimeters. Also unexpectedly, the standard deviations for other physical properties were reduced. In other words, use of the vacuum vent unexpectedly improved the consistency and uniformity of the product thermoplastic composition.

Another embodiment is a method of preparing a thermoplastic composition, comprising: melt kneading 60 to 80 weight percent of poly(2,6-dimethyl-1,4-phenylene ether) having an intrinsic viscosity of 0.35 to 0.45 deciliter per gram, measured at 25° C. in chloroform, 5 to 15 weight percent of a rubber-modified polystyrene, 2 to 10 weight percent of a polystyrene-polybutadiene-polystyrene triblock copolymer, 5 to 15 weight percent of bisphenol A bis(diphenyl phosphate), 0.2 to 1 weight percent of citric acid, and 1.5 to 6 weight percent of a functionalized polysiloxane having the formula

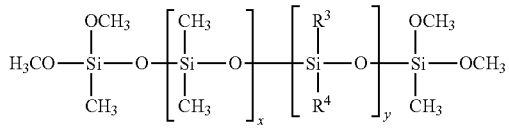

wherein each occurrence of $R^3$ is independently methyl or a 3-[(2-aminoethyl)amino]propyl group, provided that at least one occurrence of $R^3$ is a 3-[(2-aminoethyl)amino]propyl group, $R^4$ is a bridging oxygen or methyl, x is 10 to 100, and y is 1 to 10 to form a thermoplastic composition; wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 millimeters. In some embodiments, the melt kneading is conducted on an extruder comprising a vacuum vent in the downstream one third of the extruder; and wherein the vacuum vent is maintained at a vacuum of 30 to 76 centimeters of mercury.

Various orders of addition of components may be used during the melt kneading. All the components of the composition may be added at the same time and melt mixed. Alternatively, a poly(arylene ether), organic acid, and functionalized polysiloxane can be melt mixed to form a first mixture, and an organophosphate ester can then be melt mixed with the first mixture. The first mixture may be pelletized prior to melt mixing with the organophosphate ester. In another alternative, the poly(arylene ether) and the organic acid are melt mixed to form a first mixture, and the first mixture is then melt mixed with the functionalized polysiloxane to form a second mixture, which in turn is melt mixed with the organophosphate ester flame retardant.

The composition(s) and method(s) of making are further demonstrated by the following non-limiting examples.

EXAMPLES 1-28

The following examples were prepared using the materials listed in Table 1. Amounts of the materials in Tables 3-17 are in weight percent based on the total weight of the thermoplastic composition.

TABLE 1

| Material | Description |
|---|---|
| PPE I | A poly(2,6-dimethylphenylene ether) with an intrinsic viscosity of 0.40 dl/g as measured in chloroform at 25° C. commercially available from GE Plastics under the grade name PPO 640. |
| PPE II | A poly(2,6-dimethylphenylene ether) with an intrinsic viscosity of 0.46 dl/g as measured in chloroform at 25° C. commercially available from GE Plastics under the grade name PPO 646. |
| PPE III | A poly(2,6-dimethylphenylene ether) with an intrinsic viscosity of 0.33 dl/g as measured in chloroform at 25° C. commercially available from GE Plastics under the grade name PPO 630. |
| PPE IV | A poly(arylene ether) that is a copolymer of monomers consisting of 18 weight percent 2,3,6-trimethylphenol and 82 weight percent 2,6-dimethylphenol, the poly(arylene ether) having an intrinsic viscosity of 0.41 dl/g as measured in chloroform at 25° C.; commercially available from GE Plastics as PPO 809. |
| MA-g-PPE | PPE III and maleic anhydride melt-mixed in a weight ratio of 98 to 2 |
| CA-g-PPE | PPE I and Citric Acid melt-mixed in a weight ratio of 98 to 2 |
| FA-g-PPE | PPE I and Fumaric Acid melt-mixed in a weight ratio of 98 to 2. |
| SBS I | A polystyrene-polybutadiene-polystyrene block copolymer commercially available from Dexco Polymers under the tradename Vector 8508D |
| SBS II | A polystyrene-polybutadiene-polystyrene block copolymer commercially available from Kraton Polymers under the tradename KRATON D1101. |
| SEBS | A polystyrene-poly(ethylene-butylene)-polystyrene block copolymer commercially available from Kraton Polymers under the tradename KRATON G1651 |
| HIPS | A high impact polystyrene having a polybutadiene content of 9.7 to 11.1 weight percent based on the total weight of the high impact polystyrene and rubber particle size typically between 0.5 to 1 micron, commercially available from Nova under trade name FX510 or from GE Plastics under the grade name L3190. |
| Low Gloss HIPS | A high impact polystyrene having a polybutadiene content of 9.8 to 10.8 weight percent based on the total weight of the high impact polystyrene. This HIPS typically has rubber particle size between 1 to 2 microns. Available from Chevron Phillips under trade name EB6755 or from Nova under grade name FX530. |
| RDP | Resorcinol bis(diphenyl phosphate) (CAS Reg. No. 57583-54-7) commercially available from Supresta as Fyrolflex RDP. |
| LLDPE | A linear low density polyethylene obtained from ExxonMobil as LL5100.09 |
| BPADP | Bisphenol A bis(diphenyl phosphate) (CAS Reg. No. 5945-33-5) commercially available from Supresta as Fyrolflex BDP. |
| SF1706 | A polysiloxane having primary amine functional groups in an amount of 0.46 milliequivalents per gram of polysiloxane and a viscosity of 10 to 50 centistokes (CAS Reg. No. 67923-07-3). The polysiloxane also has methoxy groups attached to terminal silicone atoms. The polysiloxane is commercially available from Momentive Performance Materials Inc. under the tradename SF 1706. |

TABLE 1-continued

| Material | Description |
|---|---|
| SF50 | A polydimethylsiloxane having no primary amine functional groups and a viscosity of 47.5 to 52.5 centistokes (CAS Reg. No. 63148-62-9). The polysiloxane is commercially available from Momentive Performance Materials Inc. under the tradename SF50. |
| SF9750 | A polydimethylsiloxane having no primary amine functional groups and a viscosity of 47.5 to 52.5 centistokes (CAS Reg. No. 63148-62-9). The polysiloxane is commercially available from Momentive Performance Materials Inc. under the tradename SF9750. |
| SF1000 | A polydimethylsiloxane having no primary functional groups and a viscosity at 23° C. of 1,000 centistokes (CAS Reg. No. 63148-62-9). The polysiloxane is commercially available from Momentive Performance Materials Inc., under the trade name SF1000. |
| SF1923 | A polydimethylsiloxane having amino functional groups (about 0.22 milliequivalents amine per gram of polydimethylsiloxane) and a viscosity at 23° C. of 1500-2500 centistokes. (CAS Reg. No. 71750-79-3). The polydimethylsiloxane is commercially available from Momentive Performance Materials Inc. under the tradename SF1923. |
| GAS1027 | A polydimethylsiloxane having amino functional groups (about 0.44-0.49 milliequivalents amine per gram of polydimethylsiloxane) and a viscosity at 23° C. of 800-1200 centistokes. (CAS Reg. No. 71750-79-3). The polydimethylsiloxane is commercially available from Momentive Performance Materials Inc. under the tradename GAS1027. |
| SF1708 | A polydimethylsiloxane having amino functional groups (about 0.77 milliequivalents amine per gram of polysiloxane) and a viscosity at 23° C. of 1200-1500 centistokes. (CAS Reg. No. 71750-79-3). The polydimethylsiloxane is commercially available from Momentive Performance Materials Inc. under the tradename SF1708. |
| OF7747 | A polydimethylsiloxane having amino functional groups (about 0.4-0.46 milliequivalents amine per gram of polydimethylsiloxane) and a viscosity at 23° C. of 300-800 centistokes. (CAS Reg. No. 71750-80-6). The polydimethylsiloxane also has methoxy groups attached to terminal silicone atoms. The polydimethylsiloxane is commercially available from Momentive Performance Materials Inc. under the tradename OF7747. |
| TP3635 | A polydimethylsiloxane having amino functional groups (about 0.9-1.3 milliequivalents amine per gram of polydimethylsiloxane) and a viscosity at 23° C. of 30-50 centistokes. (CAS Reg. No. 67923-07-3). The polydimethylsiloxane also has methoxy groups attached to terminal silicon atoms. The polydimethylsiloxane is commercially available from Momentive Performance Materials Inc. under the tradename TP3635. |
| TSF4706 | A polydimethylsiloxane having amino functional groups (about 0.48 milliequivalents amine per gram of polysiloxane) and a viscosity at 23° C. of 50 centistokes. (CAS Reg. No. 71750-79-3). The polydimethylsiloxane is commercially available from Momentive Performance Materials Inc. under the trade name TSF4706. |
| 81893 (SE4029) | A polydimethylsiloxane having terminal methoxy groups, phenyl groups in the backbone, and a viscosity at 23° C. of 32-60 centistokes. (CAS Reg. No. 68951-94-0). This polydimethylsiloxane has about 50-55 weight percent of $Si(Ph_2)O$ groups where Ph denotes a phenyl group. The polydimethylsiloxane is commercially available from Momentive Performance Materials Inc. under the trade names 81893 and SE4029. |
| 81904LT | A mixture of siloxanes that contains about 10-30% of mixed polycyclosiloxanes (CAS Reg. No. 69430-24-6), 1-5% of octamethylcyclotetrasiloxane, (CAS Reg. No. 556-67-2), and 60-80% of polydimethylsiloxanes with methoxy termination (CAS Reg. No. 68951-97-3). This polydimethylsiloxane was obtained from Momentive Performance Materials Inc. under the trade name 81904LT. |
| Arkon P125 | Hydrogenated hydrocarbon resin available from Arakawa Chemicals Limited. |
| Succinic acid | CAS Reg. No. 110-15-6 |
| Citric acid | CAS Reg. No. 77-92-9 |
| Maleic Anhydride | CAS Reg. No. 108-31-6 |
| Benzoic Acid | CAS Reg. No. 65-85-0 |
| Stearic Acid | CAS Reg. No. 57-11-4 |
| Fumaric Acid | CAS Reg. No. 110-17-8 |
| Pluronic F88 | A polyepoxide mold release agent (a copolymer of propylene oxide and ethylene oxide) obtained from BASF as Pluronic F88. |
| Seenox 412S | Pentaerythritol tetrakis(3-dodecylthiopropionate), obtained as Seenox 412S from Shipro Kasei Kaisha |

Additional structural information about the functionalized polysiloxanes mentioned in Table 1 is provide in Table 2 with reference to structure below

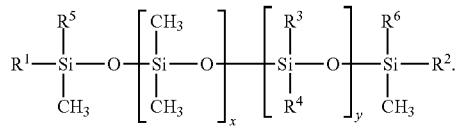

TABLE 2

| Grade | $R^1$ | $R^2$ | $R^3$ | $R^4$ | $R^5$ | $R^6$ | X | Y | Viscosity (cSt) | amine (meq/g) | Functionalized? |
|---|---|---|---|---|---|---|---|---|---|---|---|
| SF1706 | $OCH_3$ | $OCH_3$ | "A"[1]/ $CH_3$ (1:1) | O | $OCH_3$ | $OCH_3$ | 50 | 1 | 10-50 | 0.46 | yes |
| SF50 | $CH_3$ | $CH_3$ | — | — | $CH_3$ | $CH_3$ | 49 | 0 | 47.5-52.5 | 0 | no |
| SF9750 | $CH_3$ | $CH_3$ | — | — | $CH_3$ | $CH_3$ | 49 | 0 | 47.5-52.5 | 0 | no |
| SF1000 | $CH_3$ | $CH_3$ | — | — | $CH_3$ | $CH_3$ | 375 | 0 | 1000 | 0 | no |
| SF1923 | $CH_3$ | $CH_3$ | "A" | $CH_3$ | $CH_3$ | $CH_3$ | 320 | 2.9 | 1000-3000 | 0.24 | yes |
| GAS1027 | $CH_3$/ $OCH_3$ | $CH_3$/ $OCH_3$ | "A" | $CH_3$ | $CH_3$ | $CH_3$ | NI[2] | NI | 800-1200 | 0.44-0.49 | yes |
| SF1708 | $CH_3$ | $CH_3$ | "A" | $CH_3$ | $CH_3$ | $CH_3$ | 340 | 10.6 | 1250-2500 | 0.77 | yes |
| OF7747 | $OCH_3$ | $OCH_3$ | "A" | O | $CH_3$ | $CH_3$ | 100 | 1.5 | 300-800 | 0.40-0.46 | yes |
| TP3635 | $OCH_3$ | $OCH_3$ | "A" | $CH_3$ | $CH_3$ | $CH_3$ | 21 | 1 | 30-50 | 0.9-1.3 | yes |
| TSF4706 | $CH_3$ | $CH_3$ | "A" | $CH_3$ | $CH_3$ | $CH_3$ | 50 | 1 | 50 | 0.48 | yes |
| 81893[2] (SE4029) | $OCH_3$ | $OCH_3$ | Ph[4] | Ph | $CH_3$ | $CH_3$ | 25-35 | 10-15 | 32-60 | 0 | yes |
| 81904LT | $OCH_3$ | $OCH_3$ | — | — | $CH_3$ | $CH_3$ | NI | 0 | 20-40 | 0 | yes |

[1]"A" is

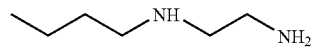

[2]NI = no information available
[3]81893 (SE4029) has about 50-55% $Si(Ph_2)O$ by weight.
[4]Ph denotes phenyl group Flame resistance was determined in accordance with Underwriter's Laboratory Bulletin 94 entitled "Tests for Flammability of Plastic Materials, UL 94", 2006 ("UL 94"). Specifically, the "20 mm Vertical Burning Test" was used with the sample thicknesses noted in the Tables below.

Smoke density was determined according to ASTM E662-06 using a flaming mode and an energy input from the radiant panel of 2.5 watts per square centimeter (25 kilowatts per square meter). The samples were injection molded and had a thickness of 1.5 millimeters. Prior to testing the samples were conditioned at 23° C. and 50% relative humidity for 24 hours. Results are the average of three measurements. Specific optical density ($D_s$) was determined at 4 minutes. The maximum optical density ($D_s$ max) was also determined as well as the time, in minutes, required to reach $D_s$ max ($D_s$ max time). When values are noted as "corrected" the values were corrected to account for the deposition of particulate matter on the optical window.

Examples 1-28 were prepared using the compositions summarized in Tables 3-5. The components of the compositions were blended in a Henschel mixer and added at the feed throat of a 25-millimeter inner diameter twin-screw extruder with a length to diameter ratio of 25.5:1. The extruder was operated at barrel temperatures of 260 to 290° C. and a screw rotation rate of 250 to 300 rotations per minute (rpm). Feed rates were 25 to 50 pounds per hour (11 to 22 kilograms per hour). The blend was extruded in strands and pelletized. The pelletized compositions were injection molded into test specimens, except Example 5, which could not be molded due to pellets being slippery. The compositions were tested for the physical properties as listed in Tables 3-5.

The data in Tables 3-5 show that the base formulation of Example 1 has a smoke density of 443 at 4 minutes and a maximum smoke density of 467.3 over the initial twenty minute period at a 1.5 millimeter sample thickness when measured according to ASTM E662-06. On addition of citric acid to this formulation, as demonstrated in Example 2, there is very little effect on smoke density. However, on addition of several different polysiloxanes shown in Examples 3, 4, and 6-9, there is a further reduction in smoke density to a value between 287 to 363 at 4 minutes, and a maximum smoke density of between 272.3 to 338 in the initial 20 minutes. Moreover, a combination of an organic acid such as citric acid or succinic acid with polysiloxane fluid SF1706 which has amino groups, methoxy groups, and viscosity in a range of 10-50 centistokes provided a substantial reduction in smoke density at 4 minutes of 182, 105.3 and 134 respectively for Examples 12, 16, and 20. There is also a reduction in the maximum smoke density over the initial twenty-minute period to values of 256.5, 270, and 219.3 respectively. This improved smoke performance is further reflected in a delay in the time to $D_s$ max of 9.9, 16.8 and 13.7 minutes compared to values between 3 and 6.5 minutes for examples that contained only the citric acid or only polysiloxanes or combinations of polysiloxanes other than SF1706 with citric acid. As seen from Examples 10-20, not all polysiloxanes, including those with amino content or viscosity comparable to SF1706 are as effective in their ability to reduce the smoke density. Examples 12, 16, and 20 also show equivalent or better flame rating (V-0) than Examples 1-11, 13-15, and 17-19.

Examples 21-28 shown in Table 5 were more difficult to mold owing to the higher loading of polysiloxane, but they show that at higher loadings of polysiloxane, the SF1706 has similar effectiveness to reduce smoke generation without the addition of citric acid. However, SF1706 is more effective than other polysiloxane fluids tested. Thus, increasing the level of polysiloxane may compensate for the lack of a suitable organic acid to reduce smoke; however, the increased level detrimentally affects the molding characteristics and limits their commercial utility.

TABLE 3

|  | 1* | 2* | 3* | 4* | 5* |
|---|---|---|---|---|---|
| PPE I | 56.0 | 55.4 | 54.4 | 54.4 | 54.4 |
| SBS I | 9.9 | 9.8 | 9.6 | 9.6 | 9.6 |
| LDPE | 1.5 | 1.5 | 1.4 | 1.4 | 1.4 |
| ZnS | 1.0 | 1.0 | 1.0 | 1.0 | 1.0 |
| ZnO | 1.0 | 1.0 | 1.0 | 1.0 | 1.0 |
| Irgafos 168 | 0.5 | 0.5 | 0.5 | 0.5 | 0.5 |
| HIPS | 14.4 | 14.3 | 14.0 | 14.0 | 14.0 |
| RDP | 15.8 | 15.6 | 15.3 | 15.3 | 15.3 |
| Citric acid | 0 | 1.0 | 0 | 0 | 0 |
| Succinic acid | 0 | 0 | 0 | 0 | 0 |
| SF50 | 0 | 0 | 2.9 | 0 | 0 |
| SF9750 | 0 | 0 | 0 | 2.9 | 0 |
| SF1000 | 0 | 0 | 0 | 0 | 2.9 |
| SF1706 | 0 | 0 | 0 | 0 | 0 |
| SF1923 | 0 | 0 | 0 | 0 | 0 |
| GAS1027 | 0 | 0 | 0 | 0 | 0 |
| SF1708 | 0 | 0 | 0 | 0 | 0 |
| Total | 100.0 | 100.0 | 100.0 | 100.0 | 100.0 |
| UL 94 Rating, 1.6 mm thickness | V-1 | V-0 | V-1 | V-1 | —** |
| $D_s$ at 4 min, 1.5 mm thickness | 443 | 476 | 343.8 | 287.3 | — |
| $D_s$ Max (corrected), 1.5 mm thickness | 467.3 | 448.3 | 312.7 | 272.3 | — |
| $D_s$ Max Time (min), 1.5 mm thickness | 3.6 | 3.9 | 4.3 | 5.1 | — |

|  | 6* | 7* | 8* | 9* |
|---|---|---|---|---|
| PPE I | 54.4 | 54.4 | 54.4 | 54.4 |
| SBS I | 9.6 | 9.6 | 9.6 | 9.6 |
| LDPE | 1.4 | 1.4 | 1.4 | 1.4 |
| ZnS | 1.0 | 1.0 | 1.0 | 1.0 |
| ZnO | 1.0 | 1.0 | 1.0 | 1.0 |
| Irgafos 168 | 0.5 | 0.5 | 0.5 | 0.5 |
| HIPS | 14.0 | 14.0 | 14.0 | 14.0 |
| RDP | 15.3 | 15.3 | 15.3 | 15.3 |
| Citric acid | 0 | 0 | 0 | 0 |
| Succinic acid | 0 | 0 | 0 | 0 |
| SF50 | 0 | 0 | 0 | 0 |
| SF9750 | 0 | 0 | 0 | 0 |
| SF1000 | 0 | 0 | 0 | 0 |
| SF1706 | 2.9 | 0 | 0 | 0 |
| SF1923 | 0 | 2.9 | 0 | 0 |
| GAS1027 | 0 | 0 | 2.9 | 0 |
| SF1708 | 0 | 0 | 0 | 2.9 |
| Total | 100.0 | 100.0 | 100.0 | 100.0 |
| UL 94 Rating, 1.6 mm thickness | V-0 | V-1 | V-1 | V-1 |
| $D_s$ at 4 min, 1.5 mm thickness | 332.7 | 327.8 | 363.3 | 323.3 |
| $D_s$ Max (corrected), 1.5 mm thickness | 337.7 | 299 | 338 | 313.7 |
| $D_s$ Max Time (min), 1.5 mm thickness | 5.2 | 4.1 | 3.4 | 3.4 |

*Denotes comparative example
**Could not be molded

TABLE 4

|  | 10* | 11* | 12 | 13* | 14* | 15* |
|---|---|---|---|---|---|---|
| PPE I | 53.8 | 53.8 | 53.8 | 53.8 | 53.8 | 53.8 |
| SBS I | 9.5 | 9.5 | 9.5 | 9.5 | 9.5 | 9.5 |
| LDPE | 1.4 | 1.4 | 1.4 | 1.4 | 1.4 | 1.4 |
| ZnS | 0.9 | 0.9 | 0.9 | 0.9 | 0.9 | 0.9 |
| ZnO | 0.9 | 0.9 | 0.9 | 0.9 | 0.9 | 0.9 |
| Irgafos 168 | 0.5 | 0.5 | 0.5 | 0.5 | 0.5 | 0.5 |
| HIPS | 13.9 | 13.9 | 13.9 | 13.9 | 13.9 | 13.9 |
| RDP | 15.2 | 15.2 | 15.2 | 15.2 | 15.2 | 15.2 |
| Citric acid | 0.9 | 0 | 0 | 0 | 0 | 0 |
| Succinic acid | 0 | 0.9 | 0.9 | 0.9 | 0.9 | 0.9 |
| SF50 | 2.8 | 2.8 | 0 | 0 | 0 | 0 |
| SF1706 | 0 | 0 | 2.8 | 0 | 0 | 0 |
| SF1923 | 0 | 0 | 0 | 2.8 | 0 | 0 |
| GAS1027 | 0 | 0 | 0 | 0 | 2.8 | 0 |
| SF1708 | 0 | 0 | 0 | 0 | 0 | 2.8 |
| Total | 100.0 | 100.0 | 100.0 | 100.0 | 100.0 | 100.0 |
| UL Rating, 1.6 mm thickness | V-1 | V-1 | V-0 | V-1 | V-1 | V-0 |
| $D_s$ at 4 min, 1.5 mm thickness | 327.7 | 350.2 | 182.3 | 347.8 | 322 | 327 |
| $D_s$ Max (corrected), 1.5 mm thickness | 312.7 | 318.2 | 256.5 | 330 | 327.7 | 314.3 |
| $D_s$ Max Time (min), 1.5 mm thickness | 5.5 | 4.1 | 9.9 | 4.1 | 4.3 | 3.9 |

|  | 16 | 17* | 18* | 19* | 20 |
|---|---|---|---|---|---|
| PPE I | 53.8 | 53.8 | 53.8 | 53.8 | 53.6 |
| SBS I | 9.5 | 9.5 | 9.5 | 9.5 | 9.5 |
| LDPE | 1.4 | 1.4 | 1.4 | 1.4 | 1.4 |
| ZnS | 0.9 | 0.9 | 0.9 | 0.9 | 0.9 |
| ZnO | 0.9 | 0.9 | 0.9 | 0.9 | 0.9 |
| Irgafos 168 | 0.5 | 0.5 | 0.5 | 0.5 | 0.5 |
| HIPS | 13.9 | 13.9 | 13.9 | 13.9 | 13.8 |
| RDP | 15.2 | 15.2 | 15.2 | 15.2 | 15.1 |
| Citric acid | 0.9 | 0.9 | 0.9 | 0.9 | 0.9 |
| Succinic acid | 0 | 0 | 0 | 0 | 0 |
| SF50 | 0 | 0 | 0 | 0 | 0 |
| SF1706 | 2.8 | 0 | 0 | 0 | 3.3 |
| SF1923 | 0 | 2.8 | 0 | 0 | 0 |
| GAS1027 | 0 | 0 | 2.8 | 0 | 0 |
| SF1708 | 0 | 0 | 0 | 2.8 | 0 |
| Total | 100.0 | 100.0 | 100.0 | 100.0 | 100.0 |
| UL Rating, 1.6 mm thickness | V-1 | V-1 | V-1 | V-1 | V-0 |
| $D_s$ at 4 min, 1.5 mm thickness | 105.3 | 245.3 | 289.3 | 271.7 | 134 |
| $D_s$ Max (corrected), 1.5 mm thickness | 270 | 290.3 | 277 | 272.3 | 219.3 |
| $D_s$ Max Time (min), 1.5 mm thickness | 16.8 | 5.8 | 4.6 | 6.5 | 13.7 |

*Denotes comparative example

TABLE 5

|  | 21 | 22* | 23* | 24* | 25 | 26* | 27* | 28* |
|---|---|---|---|---|---|---|---|---|
| PPE I | 53.3 | 53.3 | 53.3 | 53.3 | 52.8 | 52.8 | 52.8 | 52.8 |
| SBS I | 9.4 | 9.4 | 9.4 | 9.4 | 9.3 | 9.3 | 9.3 | 9.3 |
| LDPE | 1.4 | 1.4 | 1.4 | 1.4 | 1.4 | 1.4 | 1.4 | 1.4 |
| ZnS | 0.9 | 0.9 | 0.9 | 0.9 | 0.9 | 0.9 | 0.9 | 0.9 |
| ZnO | 0.9 | 0.9 | 0.9 | 0.9 | 0.9 | 0.9 | 0.9 | 0.9 |
| Irgafos 168 | 0.5 | 0.5 | 0.5 | 0.5 | 0.5 | 0.5 | 0.5 | 0.5 |
| HIPS | 13.7 | 13.7 | 13.7 | 13.7 | 13.6 | 13.6 | 13.6 | 13.6 |
| RDP | 15.1 | 15.1 | 15.1 | 15.1 | 14.9 | 14.9 | 14.9 | 14.9 |
| Citric acid | 0 | 0 | 0 | 0 | 0.9 | 0.9 | 0.9 | 0.9 |
| SF1706 | 4.7 | 0 | 0 | 0 | 4.7 | 0 | 0 | 0 |
| SF1923 | 0 | 4.7 | 0 | 0 | 0 | 4.7 | 0 | 0 |
| GAS1027 | 0 | 0 | 4.7 | 0 | 0 | 0 | 4.7 | 0 |
| SF1708 | 0 | 0 | 0 | 4.7 | 0 | 0 | 0 | 4.7 |
| Total | 100.0 | 100.0 | 100.0 | 100.0 | 100.0 | 100.0 | 100.0 | 100.0 |
| UL Rating, 1.6 mm thickness | V-0 | V-1 | V-1 | V-0 | V-0 | None | V-1 | V-1 |
| $D_s$ at 4 min, 1.5 mm thickness | 114 | 313.70 | 184.7 | 280 | 131.7 | 309 | 358 | 262.7 |

TABLE 5-continued

|  | 21 | 22* | 23* | 24* | 25 | 26* | 27* | 28* |
|---|---|---|---|---|---|---|---|---|
| $D_s$ Max (corrected), 1.5 mm thickness | 241 | 295.30 | 304 | 269.7 | 234.7 | 302.6 | 318.7 | 254.3 |
| $D_s$ Max Time (min), 1.5 mm thickness | 13.9 | 6.30 | 7.7 | 5.3 | 12 | 5.5 | 2.8 | 5.5 |

*Denotes comparative example. Examples 21-28 in general were difficult to mold compared to samples with lower silicone content due to slippery pellets, splay on parts, and delamination of parts.

EXAMPLES 29-34

Examples 29-34 were prepared using the compositions summarized in Table 6. The components of the compositions were blended in a Henschel mixer and added at the feed throat of a 25-millimeter twin-screw extruder with a length to diameter ratio of 25.5:1. The extruder was operated at barrel temperatures of 260 to 290° C. and rotations per minute (rpm) of 250 to 300. Feed rates were 25 to 50 pounds per hour (11 to 22 kilograms per hour). The blend was extruded in strands and pelletized. The pelletized compositions were injection molded into test specimens. The compositions were tested for the properties as described in Table 6.

In Table 6, Example 29 is a comparative composition that does not have any polysiloxane fluid or organic acid synergist. When tested at a thickness of 3.2 millimeters, this formulation shows a 4-minute smoke density of 364 and a maximum smoke density over the initial 20 minute period of 476. On addition of polysiloxane fluid and citric acid as in Example 30, both smoke density values are dramatically reduced, and the time to reach $D_s$ max increases significantly to 19.8 minutes, up from 6.4 minutes for Example 29. Example 33 demonstrates the use of TP3635, which, compared to SF1706, is also an aminopolysiloxane and has a similar viscosity, but has a higher concentration of amine groups and a lower concentration of methoxy groups per molecule (see Table 2).

Example 31 uses OF7747 as a polysiloxane fluid, which has higher viscosity (300-800 centistokes) compared to SF1706 or TP3635 (50 centistokes). OF7747 also contains alkoxy groups attached to polysiloxane silicon atoms, as shown in Table 2, but fewer alkoxy groups per molecule. The use of TP3635, as shown in Examples 32 and 34, is associated with further reduction in smoke density compared to Example 31. Also, Example 31 had a reduced flame retardancy rating (V-1) compared to Examples 32 and 34 (V-0). This illustrates that a polysiloxane fluid with methoxy groups, amine content, and viscosity of 30-100 centistokes, in combination with an organic acid, is highly effective for reducing smoke density.

TABLE 6

|  | 29* | 30 | 31* | 32 | 33 | 34 |
|---|---|---|---|---|---|---|
| PPE I | 73.35 | 69.35 | 62.35 | 69.35 | 67.85 | 62.35 |
| HIPS | 10 | 10 | 15 | 10 | 10 | 15 |
| SBS II | 5 | 5 | 5 | 5 | 5 | 5 |
| BPADP | 10 | 10 | 12 | 10 | 10 | 12 |
| Irgafos 168 | 0.2 | 0.2 | 0.2 | 0.2 | 0.2 | 0.2 |
| ZnS | 0.3 | 0.3 | 0.3 | 0.3 | 0.3 | 0.3 |
| ZnO | 0.15 | 0.15 | 0.15 | 0.15 | 0.15 | 0.15 |
| LLDPE | 0.5 | 0.5 | 0.5 | 0.5 | 0.5 | 0.5 |
| Irganox 1076 | 0.5 | 0.5 | 0.5 | 0.5 | 0.5 | 0.5 |
| SF1706 | 0 | 3.5 | 0 | 0 | 0 | 0 |
| OF7747 | 0 | 0 | 3.5 | 0 | 0 | 0 |
| TP3635 | 0 | 0 | 0 | 3.5 | 5 | 3.5 |
| Citric Acid | 0 | 0.5 | 0.5 | 0.5 | 0.5 | 0.5 |
| Total | 100 | 100 | 100 | 100 | 100 | 100 |
| UL-94 rating at 1.6 mm thickness | V-0 | V-0 | V-1 | V-0 | V-0 | V-0 |
| $D_s$ at 4 min at 3.2 mm thickness | 364 | 26 | 203 | 85 | 20 | 18 |
| $D_s$ max (corrected) at 3.2 mm thickness | 476 | 123 | 466 | 263 | 184 | 183 |
| Time for $D_s$ max at 3.2 mm thickness | 6.4 | 19.8 | 9.6 | 18.5 | 19.5 | 19.5 |

*Denotes comparative example

EXAMPLES 35-38

Examples 35-38 show the effect of a hydrogenated hydrocarbon resin in boosting flow properties of the resin matrix. Examples 36, 37, and 38 have increasing amounts of the hydrogenated hydrocarbon resin Arkon P-125 compared to the control Example 35, and they show increase in flow as indicated by decreasing melt viscosity measured by capillary rheometry. In the capillary rheometry method, the sample is heated to 320° C. and dwelled for 240 seconds before shear is applied to measure viscosity as a function of the shear rate. Interestingly, the smoke properties are relatively unaffected at loadings of Arkon P-125 of 2.91% and 4.86%, however an increase in $D_s$ max is observed at the highest loading of 9.86% in Example 38. Samples with increased loading of Arkon P-125 also show decreased heat deflection temperature as measured by the ASTM D648, and a reduction in notched Izod impact strength measured per ASTM D256.

TABLE 7

|  | 35 | 36 | 37 | 38 |
|---|---|---|---|---|
| PPE II | 78.18 | 75.26 | 73.32 | 68.47 |
| SF1706 | 3.40 | 3.40 | 3.40 | 3.40 |
| Citric Acid | 0.49 | 0.49 | 0.49 | 0.49 |
| SBS II | 4.86 | 4.86 | 4.86 | 4.86 |
| Arkon P-125 | 0 | 2.91 | 4.86 | 9.71 |
| ZnS | 0.29 | 0.29 | 0.29 | 0.29 |
| ZnO | 0.15 | 0.15 | 0.15 | 0.15 |
| Irganox 1076 | 0.19 | 0.19 | 0.19 | 0.19 |
| Seenox 412S | 0.29 | 0.29 | 0.29 | 0.29 |
| LLDPE | 0.49 | 0.49 | 0.49 | 0.49 |
| Carbon Black | 0.02 | 0.02 | 0.02 | 0.02 |
| $TiO_2$ | 1.94 | 1.94 | 1.94 | 1.94 |
| Low Gloss HIPS | 4.86 | 4.86 | 4.86 | 4.86 |
| RDP | 4.86 | 4.86 | 4.86 | 4.86 |
| Total | 100 | 100 | 100 | 100 |
| Heat Deflection Temperature, 3.2 mm ASTM method 1.82 MPa load | 141 | 137 | 133 | 127 |
| Notched Izod Impact Strength J/m ASTM Method | 258 | 246 | 193 | 122 |
| UL 94 rating at 1.5 mm thickness | V-0 | V-0 | V-0 | V-0 |
| Melt viscosity, at shear of 100 (1/sec), in Pa-s at 320 C., capillary L/D 20:1, 240 seconds dwell time | 1269.2 | 939.5 | 845.1 | 621.3 |
| Melt viscosity, at shear of 1500 (1/sec), in Pa-s at 320 C., capillary L/D 20:1, 240 seconds dwell time | 306.5 | 255.4 | 234.3 | 183.7 |
| Melt viscosity, at shear of 3000 (1/sec), in Pa-s at 320 C., capillary L/D 20:1, 240 seconds dwell time | 195.9 | 164.9 | 153.2 | 120.9 |
| $D_S$ at 4 min, 3.2 mm thickness | 18.96 | 17.14 | 21.89 | 45.31 |
| $D_S$ max (corrected), 3.2 mm thickness. | 148 | 199 | 170 | 309 |
| Time to $D_S$ max at 3.2 mm thickness | 19.98 | 20.21 | 19.99 | 18.81 |

EXAMPLES 39-61

Examples 39-61 were prepared using the compositions shown in Tables 8-10. The components of the compositions were blended in a Henschel mixer and added at the feed throat of a 25-millimeter twin-screw extruder with a length to diameter ratio of 25.5:1. The extruder was operated at barrel temperatures of 260 to 290° C. and at speeds of 250 to 300 rotations per minute (rpm). Feed rates were 25 to 50 pounds per hour (11 to 22 kilograms per hour). The blend was extruded in strands and pelletized. Pellets were subsequently molded into appropriately sized parts for smoke density, flammability and mechanical testing.

Example 39 is the base formulation that contains PPE I, High Impact Polystyrene (HIPS), impact modifier (SBS II), and flame retardant (BPADP), but neither polysiloxane fluid nor organic acid. Example 40 is a formulation with the functionalized polysiloxane SF1706 at 3.5 weight percent loading, but no organic acid synergist. Example 41 contains functionalized polysiloxane SF1706 and citric acid, which are both added along with other ingredients at the feed throat of the extruder. Example 42 is a formulation that comprises maleic anhydride instead of citric acid, the maleic acid being added with other ingredients at the feed throat. The Example 42 formulation also uses high-heat PPE IV. Example 42A is a formulation with maleic anhydride in the feed throat with 0.40 IV PPE I. Examples 42A and 43 thus illustrate the effect of precompounding the maleic anhydride into the PPE versus adding it with the other ingredients. Examples 42 and 42A illustrate the effect of a different type of PPE on properties.

Example 43 is made with a two step process. The first step comprises premixing and compounding PPE III and maleic anhydride in a weight ratio of 70.1 to 1.4 into the feed of a twin-screw extruder, melt mixed and strand palletized to prepare the "MA-g-PPE". It is then ground and combined with the other ingredients shown in Table 8, fed to the extruder, stranded and palletized like the other formulations in Table 8. Example 43 can thus be compared to example 42A, however there are two differences between the two. Example 42A is a one step process, whereas example 43 is a two step process, moreover example 42A uses 0.40 IV PPE where as the two step process uses a 0.33IV PPE. Example 44 shows the use of citric acid at twice the loading of Example 41. Examples 45, 47, 49, 50 use different organic acids at loadings that contain the same amount of acidic groups as contained in 0.5% used in example 41. Examples 46, 48, 51 contain different acids at loadings equivalent to 1% citric acid as in Example 44.

TABLE 8

|  | 39* | 40 | 41 | 42 | 42A |
|---|---|---|---|---|---|
| PPE IV | 0 | 0 | 0 | 70.07 | 0 |
| PPE I | 75 | 71.5 | 71 | 0 | 70.1 |
| MA-g-PPE | 0 | 0 | 0 | 0 | 0 |
| HIPS | 10 | 10 | 10 | 10 | 10 |
| SBS II | 5 | 5 | 5 | 5 | 5 |
| BPADP | 10 | 10 | 10 | 10 | 10 |
| SF1706 | 0 | 3.5 | 3.5 | 3.5 | 3.5 |
| Citric Acid | 0 | 0 | 0.5 | 0 | 0 |
| Fumaric acid | 0 | 0 | 0 | 0 | 0 |
| Maleic Anhydride | 0 | 0 | 0 | 1.43 | 1.43 |
| Total | 100 | 100 | 100 | 100 | 100 |
| Notched Izod Impact Strengthk $J/m^2$ ISO Method | 8.2 | 15.5 | 11.2 | 12.5 | 9.8 |
| UL 94 Rating, 1.6 mm thickness | V-1 | V-0 | V-0 | V-1 | V-0 |
| UL 94 Flame-Out Time, sec, 1.6 mm thickness | 7.6 | 4.0 | 4.9 | 9.3 | 4.2 |
| $D_s$ at 4 min, 3.2 mm thickness | 294 | 19 | 15 | 23 | 14 |
| $D_s$ Max (corrected), 3.2 mm thickness | 477 | 199 | 127 | 272 | 102 |
| $D_s$ Max Time (min), 3.2 mm thickness | 8.3 | 16.6 | 19.5 | 19.6 | 19.6 |

|  | 43 | 44 | 45 | 46 |
|---|---|---|---|---|
| PPE IV | 0 | 0 | 0 | 0 |
| PPE I | 0 | 70.5 | 71.05 | 70.6 |
| MA-g-PPE | 71.5 | 0 | 0 | 0 |
| HIPS | 10 | 10 | 10 | 10 |

TABLE 8-continued

| | | | | |
|---|---|---|---|---|
| SBS II | 5 | 5 | 5 | 5 |
| BPADP | 10 | 10 | 10 | 10 |
| SF1706 | 3.5 | 3.5 | 3.5 | 3.5 |
| Citric Acid | 0 | 1 | 0 | 0 |
| Fumaric acid | 0 | 0 | 0.45 | 0.9 |
| Maleic Anhydride | 0 | 0 | 0 | 0 |
| Total | 100 | 100 | 100 | 100 |
| Notched Izod Impact Strength kJ/m² ISO Method | 10.7 | 13.8 | 15.8 | 12.1 |
| UL 94 Rating, 1.6 mm thickness | V-0 | V-0 | V-0 | V-0 |
| UL 94 Flame-Out Time, sec, 1.6 mm thickness | 4.3 | 4.2 | 6.1 | 4.5 |
| $D_s$ at 4 min, 3.2 mm thickness | 16 | 17 | 14 | 15 |
| $D_s$ Max (corrected), 3.2 mm thickness | 114 | 130 | 88 | 128 |
| $D_s$ Max Time (min), 3.2 mm thickness | 19.6 | 19.6 | 19.5 | 19.1 |

*Denotes comparative example

TABLE 9

| | 47 | 48 | 49 | 50 |
|---|---|---|---|---|
| PPE I | 71.04 | 70.58 | 70.55 | 69.28 |
| HIPS | 10 | 10 | 10 | 10 |
| SBS II | 5 | 5 | 5 | 5 |
| BPADP | 10 | 10 | 10 | 10 |
| SF1706 | 3.5 | 3.5 | 3.5 | 3.5 |
| OF7747 | 0 | 0 | 0 | 0 |
| TP3635 | 0 | 0 | 0 | 0 |
| SF9750 | 0 | 0 | 0 | 0 |
| Citric Acid | 0 | 0 | 0 | 0 |
| Succinic acid | 0.46 | 0.92 | 0 | 0 |
| Benzoic acid | 0 | 0 | 0.95 | 0 |
| Stearic acid | 0 | 0 | 0 | 2.22 |
| Total | 100 | 100 | 100 | 100 |
| Notched Izod Impact Strength kJ/m² ISO Method | 15 | 13 | 16.4 | 14.8 |
| UL 94 Rating, 1.6 mm thickness | V-0 | V-0 | V-0 | V-0 |
| UL 94 Flame-Out Time, sec, 1.6 mm thickness | 4.6 | 5.2 | 5.5 | 5.8 |
| $D_S$ at 4 min, 3.2 mm thickness | 16 | 15 | 31 | 48 |
| $D_S$ Max (corrected), 3.2 mm thickness | 127 | 155 | 368 | 564 |
| $D_S$ Max Time (min), 3.2 mm thickness | 19.7 | 19.1 | 19.6 | 19.4 |

| | 51 | 52 | 53 | 54 |
|---|---|---|---|---|
| PPE I | 67.09 | 71 | 71 | 71 |
| HIPS | 10 | 10 | 10 | 10 |
| SBS II | 5 | 5 | 5 | 5 |
| BPADP | 10 | 10 | 10 | 10 |
| SF1706 | 3.5 | 0 | 0 | 0 |
| OF 7747 | 0 | 3.5 | 0 | 0 |
| TP3635 | 0 | 0 | 3.5 | 0 |
| SF9750 | 0 | 0 | 0 | 3.5 |
| Citric Acid | 0 | 0.5 | 0.5 | 0.5 |
| Succinic acid | 0 | 0 | 0 | 0 |
| Benzoic acid | 0 | 0 | 0 | 0 |
| Stearic acid | 4.41 | 0 | 0 | 0 |
| Total | 100 | 100 | 100 | 100 |
| Notched Izod Impact Strength kJ/m² ISO Method | 14.4 | 19.5 | 13.7 | 8.2 |
| UL 94 Rating, 1.6 mm thickness | V-0 | V-1 | V-0 | V-0 |
| UL 94 Flame-Out Time, sec, 1.6 mm thickness | 9.2 | 9.2 | 3.7 | 5.3 |
| $D_S$ at 4 min, 3.2 mm thickness | 75 | 126 | 18 | 174 |
| $D_S$ Max (corrected), 3.2 mm thickness | 468 | 423 | 189 | 564 |
| $D_S$ Max Time (min), 3.2 mm thickness | 19.4 | 8.2 | 19.6 | 9.6 |

TABLE 10

| | 55 | 56 | 57 | 58 |
|---|---|---|---|---|
| PPE I | 71.5 | 71 | 71.05 | 71.04 |
| HIPS | 10 | 10 | 10 | 10 |
| SBS II | 5 | 5 | 5 | 5 |
| BPADP | 10 | 10 | 10 | 10 |
| SF1706 | 0 | 0 | 0 | 0 |
| TSF4706 | 3.5 | 3.5 | 3.5 | 3.5 |
| SF50 | 0 | 0 | 0 | 0 |
| Citric Acid | 0 | 0.5 | 0 | 0 |
| Fumaric acid | 0 | 0 | 0.45 | 0 |
| Succinic acid | 0 | 0 | 0 | 0.46 |
| Stearic acid | 0 | 0 | 0 | 0 |
| Total | 100 | 100 | 100 | 100 |
| Notched Izod Impact Strength kJ/m² ISO Method | 15.5 | 9.8 | 13.5 | 10.0 |
| UL 94 Rating, 1.6 mm thickness | V-0 | V-0 | V-0 | V-0 |
| UL 94 Flame-Out Time, sec, 1.6 mm thickness | 4.2 | 3.9 | 4.6 | 6.3 |
| $D_S$ at 4 min, 3.2 mm thickness | 146 | 204 | 145 | 471 |
| $D_S$ Max (corrected), 3.2 mm thickness | 377 | 477 | 513 | 638 |
| $D_S$ Max Time (min), 3.2 mm thickness | 14.2 | 13.6 | 10 | 5.9 |

| | 59 | 60* | 61 |
|---|---|---|---|
| PPE I | 69.28 | 71 | 70.5 |
| HIPS | 10 | 10 | 10 |
| SBS II | 5 | 5 | 5 |
| BPADP | 10 | 10 | 10 |
| SF1706 | 0 | 0 | 3.5 |
| TSF4706 | 3.5 | 0 | 0 |
| SF50 | 0 | 3.5 | 0 |
| Citric Acid | 0 | 0.5 | 1 |
| Fumaric acid | 0 | 0 | 0 |
| Succinic acid | 0 | 0 | 0 |
| Stearic acid | 2.22 | 0 | 0 |
| Total | 100 | 100 | 100 |
| Notched Izod Impact Strength kJ/m² ISO Method | — | — | — |
| UL 94 Rating, 1.6 mm thickness | V-0 | — | — |
| UL 94 Flame-Out Time, sec, 1.6 mm thickness | 7.4 | — | — |
| $D_S$ at 4 min, 3.2 mm thickness | 398 | 159 | 17 |
| $D_S$ Max (corrected), 3.2 mm thickness | 634 | 554 | 133 |
| $D_S$ Max Time (min), 3.2 mm thickness | 6.6 | 11.7 | 19.6 |

*Denotes comparative example

Examples 52 through 54 show the use of different polysiloxane fluids (OF7747, TP3635 and SF9750) in combination with citric acid. Examples 55 through 59 demonstrate the use of no acid (example 55), citric acid (example 56), fumaric acid (example 57), succinic acid (example 58), and stearic acid (example 59), respectively, in combination with TSF4706. TSF4706 is a polysiloxane fluid with amine content and viscosity similar to SF1706, however, it differs from SF1706 in that it has methyl groups instead of methoxy (OMe) groups. Example 60 is an example of an unfunctionalized polysiloxane fluid SF50 in combination with citric acid. Example 61 is a replicate of Example 44, with SF1706 and 1% citric acid.

Analysis of the smoke density at 4 minutes for Examples 39 through 54 indicates that the comparative Example 39 has a smoke density of 294, which can be lowered by the addition of SF1706 alone or in combination with a number of acids added to different extents, as shown in Examples 40-52. Examples 42 and 42A, which employ different types of poly (arylene ether)s, do not show major differences in this test. Addition of polysiloxane fluid OF7747, which has amine and methoxy groups but a higher viscosity than SF1706, is also effective in combination with citric acid, as demonstrated by Example 52, but smoke density at 4 minutes is reduced only to 126 as compared to the range of 14 through 75 for SF1706 and different acids. Moreover, the polydimethylsiloxane fluid SF9750, which is similar in viscosity to SF1706 but has neither amine nor methoxy functionality, reduces smoke density only to 174. Polysiloxane fluid TP3635, on the other hand, which is similar to SF1706 in its viscosity, methoxy group content, and amine group content, is very effective in reducing the smoke density at 4 minutes down to 18 (Example 53). Silicone fluid TSF4706 is also effective in reducing the smoke density at 4 minutes to 146 (Example 55); however, it may not be as effective as SF1706, which reduces it to 19 (Example 40). Furthermore the addition of citric acid (Example 56) increases the smoke density at 4 minutes slightly in the case of TSF4706 (Example 56 vs. Example 55). Moreover, TSF4706 shows higher smoke density in combination with different acids when compared to SF1706 as understood by comparing Examples 55-59 individually to Examples 40, 41, 45, 47 and 50, respectively. Thus, in some embodiments, the methoxy groups in SF1706 are more effective than the methyl groups in TSF4706 in reducing the smoke density at 4 minutes. Example 60 shows similar performance by silicone fluid SF50 compared to SF9750 for smoke density. Examples 61 and 44 are replicates and exhibit similar performance.

For the metric $D_s$ max (corrected) at 3.2 millimeters thickness ("corrected smoke density"), Examples 39-54 indicate that the addition of SF1706 alone (Example 40) reduces the corrected smoke density to 199 versus 477 for the Example 39 control. Addition of citric acid at 0.5% further reduces this to 127 (Example 41). An increased level of citric acid does not alter the corrected smoke density appreciably (Example 44) compared to the 0.5% citric acid sample (Example 41). Maleic anhydride at a loading of 1.43% in combination with SF1706 is also quite effective, slightly more so than citric acid at 0.5% in combination with SF1706, as it reduces the corrected smoke density to 102 (Example 42A) in the initial 20 minutes. Using a masterbatch of maleic anhydride in combination with SF1706 is also quite effective, as it reduces the corrected smoke density to 114. Using a poly(arylene ether) that is a copolymer of 2,6-dimethylphenol and 2,3,6-trimethylphenol (Example 42), gives a higher value of 272 compared to a poly(arylene ether) that is a homopolymer of 2,6-dimethylphenol (Example 42A). Fumaric acid at a loading of 0.45% in combination with SF1706 is extremely effective at reducing the corrected smoke density to 88 (Example 45), however at a higher loading of 0.9% (in combination with SF1706), it shows a somewhat higher value of 128 (Example 46). Succinic acid, again in combination with SF1706 shows a similar trend in that at the lower loading of 0.46% has a corrected smoke density of 127 (Example 47), which increases to 155 at the higher loading of 0.92% (Example 48). Benzoic acid, a monoacid, on the other hand is not as effective, as it shows a considerably higher value of corrected smoke density at 368 (Example 49), whereas with 2.22% and 4.44% stearic acid (Examples 50 and 51, respectively), the corrected smoke density is extremely high at 564 and 468 respectively, even in combination with SF 1706. Thus, the addition of acids in combination of SF1706 helps, but too much acid can have a detrimental effect. When experiments with OF7747, TP3635, and SF9750 in combination with citric acid at 0.5% loading (Examples 52-54) are compared to Examples 39-41, it can be seen that OF7747 is somewhat less effective and SF9750 is not effective at all, whereas SF1706 is quite effective. Polysiloxane fluid TSF4706 has a modest effect on the corrected smoke density (Example 55) relative to the control (Example 39), reducing it by about 100 units. The addition of citric acid (Example 56) increases the corrected smoke density to levels similar to the control in the case of TSF4706 (Example 56 vs. 55). Moreover, TSF4706 shows higher smoke density in combination with different acids when compared to SF1706 as understood by comparing Examples 55-59 to Examples 40, 41, 45, 47 and 50, respectively. Thus the methoxy functionality on SF1706 contributes to the reduction in smoke performance in a more effective fashion than the methyl groups present in TSF4706. Example 60 shows similar performance by silicone fluid SF50 compared to SF9750 for smoke density. Examples 61 and 44 are replicates and exhibit similar performance.

For the metric Time to $D_s$ Max, for which higher values are more desirable, Examples 39-51 indicate that addition of SF1706 increases the time needed to reach the maximum smoke density over the initial 20 minute period, from 8.3 (Example 39, no SF1706) to 16.6 minutes (Example 40, with SF1706). However, using 0.5% citric acid in combination with SF1706 further increases it to 19.5 minutes (Example 41). When the loading of citric acid is increased to 1%, however, the time decreases to 15.9 (Example 44). Similarly, when combined with SF1706, maleic anhydride as an additive (Example 42) or as a masterbatch with poly(arylene ether) (Example 43), fumaric acid at either loading (Examples 45 and 46), succinic acid at either loading (Examples 47 and 48), and stearic acid at either loading (Examples 50 and 51) all increase the time to $D_s$ max. When used in combination with 0.5% citric acid, polysiloxane fluids OF7747 (Example 52, Time to $D_s$ Max of 8.2) and SF9750 (Example 54, Time to $D_s$ Max of 9.6) are not as effective as SF1706 (Example 41, Time to $D_s$ Max of 19.5). But TP3635 in combination with 0.5% citric acid (Example 53, Time to $D_s$ Max of 19.6) is just as effective as SF1706 in combination with 0.5% citric acid (Example 41, Time to $D_s$ Max of 19.5). Polysiloxane fluid TSF4706 increases the $D_s$ Max Time (Example 55) relative to the control (Example 39), from 8.3 to 14.2 minutes, thereby prolonging the burning process. Furthermore the addition of citric acid to TSF4706 (Example 56, time to $D_s$ Max of 13.6) reduces the $D_s$ Max Time to a level similar to that of the control (Example 55, Time to $D_s$ Max of 14.2). TSF4706 in combination with different acids also has much lower $D_s$ Max Times than SF1706 in combination with the same acids, as understood by comparing Examples 55-59 with Examples 40, 41, 45, 47 and 50, respectively. Thus the methoxy functionality on SF1706 may be contributing to the delayed smoke generation in a much more effective fashion than the methyl groups present in TSF4706. For Time to $D_s$ max, polysiloxane fluid SF50 (Example 60) shows performance similar to that of SF9750 (Example 54).

For the impact strength metric notched Izod impact strength, Examples 39-54 indicate that there is an increase in impact strength from 8.2 kJ/m$^2$ (Example 39) to 15.5 kJ/m$^2$ (Example 40) when SF1706 is added. TSF4706-based Examples 55-59 show a slight decrease in notched Izod impact strength relative to the control.

For the flammability metric UL 94 flame-out time at 1.6 millimeter thickness ("flame-out time"), control Example 39 shows a flame-out time of 7.6 seconds, which can be decreased to 4.0 by the addition of SF1706 (Example 40). Addition of SF1706 and citric acid increases that slightly to 4.9 seconds (Example 41). Maleic anhydride in combination with SF1706 also has a low flame-out time of 4.2 seconds (Example 42A). The maleic anhydride based batch that has a poly(arylene ether) that is a copolymer of 2,6-dimethylphenol and 2,3,6-trimethylphenol (Example 42) has a considerably higher flame-out time at 9.3 seconds than the formulation with a poly(arylene ether) homopolymer of 2,6-dimethylphenol (Example 42A, 4.2 seconds). A master-batch approach with a 0.40 dl/g poly(arylene ether) (Example 43) is quite effective as it gives a flame-out time of 4.3 seconds. Fumaric acid at 0.45 and 0.9% (Example 45 and 46), Succinic acid at 0.46 and 0.92% (Example 47 and 48) and benzoic acid at 0.95% (Example 49) in combination with SF1706 decreases the flame-out time to 4.6-6.1 seconds. Stearic acid at 2.22% in combination with SF1706 (Example 50) decreases the flame-out time to 5.8 seconds, however stearic acid at 4.41% in combination with SF1706 (Example 51) increases that to 9.2 seconds. The use of OF7747 in combination with 0.5% citric acid (Example 52) increases the flame-out time to 9.2 seconds. Polysiloxane fluid TP3635 in combination with 0.5% citric acid (Example 53) reduces the flame-out time to 3.7 seconds. Addition of TSF4706 reduces the flame-out time from 7.6 seconds for control Example 39 to 4.2 seconds for Example 55. This benefit is retained on addition of citric acid (Example 56), fumaric acid (Example 57), and succinic acid (Example 58). However, the addition of stearic acid in combination with TSF4706 (Example 59) is less beneficial in this regard.

EXAMPLES 62-64

Examples 62-64 were prepared using compositions shown in Table 11. Examples 62-64 also contained 1.3 weight percent of additives. Examples 62-64 were prepared as described above for Examples 1-28 with the exception that the RDP was added downstream and not at the feedthroat. The blend was extruded in strands and pelletized. The pelletized compositions were injection molded into test specimens. The compositions were tested for the physical properties listed in Table 10 as described above. Data is shown in Table 11.

TABLE 11

|  | 62 | 63 | 64 |
| --- | --- | --- | --- |
| PPE II (0.46 IV) | 78.2 | 0 | 0 |
| PPE I (0.40 IV) | 0 | 78.2 | 0 |
| PPE III (0.33 IV) | 0 | 0 | 78.2 |
| SF 1706 | 3.4 | 3.4 | 3.4 |
| Citric Acid | 0.5 | 0.5 | 0.5 |
| SBS II | 4.9 | 4.9 | 4.9 |
| TiO2 | 1.9 | 1.9 | 1.9 |
| Low Gloss HIPS | 4.9 | 4.9 | 4.9 |
| RDP | 4.9 | 4.9 | 4.9 |
| Additives | 1.3 | 1.3 | 1.3 |
| Total | 100.0 | 100.0 | 100.0 |
| UL Rating (1.0 mm) | V-0 | V-0 | V-0 |
| $D_S$ at 4 min, 3.2 mm | 19 | 13 | 11 |
| $D_S$ max (corrected), 3.2 mm | 148 | 199 | 157 |
| $D_S$ at 20 min, 3.2 mm | 151 | 200 | 158 |
| Time to $D_S$ max, 3.2 mm | 20.0 | 20.0 | 20.0 |

Examples 62 through 64 show that excellent smoke density results can be obtained using a variety of poly(arylene ether)s having different intrinsic viscosities.

EXAMPLES 65-68

Examples 65-68 were prepared using the compositions shown in Table 12. Examples 65-68 were prepared as described above with regard to Examples 62-64. The blend was extruded in strands and pelletized. The pelletized compositions were injection molded into test specimens.

TABLE 12

|  | 65 | 66 | 67 | 68 |
| --- | --- | --- | --- | --- |
| PPE II (0.46 IV) | 78.1 | 78.1 | 68.5 | 68.5 |
| SF1706 | 3.4 | 3.4 | 3.4 | 3.4 |
| Citric Acid | 0.5 | 0.5 | 0.5 | 0.5 |
| SBS II | 4.9 | 0 | 4.9 | 0 |
| SEBS | 0 | 4.9 | 0 | 4.9 |
| ZnS | 0.3 | 0.3 | 0.3 | 0.3 |
| ZnO | 0.15 | 0.15 | 0.15 | 0.15 |
| Irganox 1076 | 0.2 | 0.2 | 0.2 | 0.2 |
| Seenox 412S | 0.3 | 0.3 | 0.3 | 0.3 |
| LLDPE | 0.5 | 0.5 | 0.5 | 0.5 |
| Carbon Black | 0.02 | 0.02 | 0.02 | 0.02 |
| TiO2 | 1.9 | 1.9 | 1.9 | 1.9 |
| Low Gloss HIPS | 4.9 | 4.9 | 9.7 | 9.7 |
| RDP | 4.9 | 4.9 | 9.7 | 9.7 |
| Total | 100.0 | 100.0 | 100.0 | 100.0 |
| UL Rating at (1.5 mm) | V-0 | V-0 | V-0 | V-0 |
| $D_S$ at 4 min, 3.2 mm | 19.0 | 50.1 | 27.9 | 98.4 |
| $D_S$ max (corrected), 3.2 mm | 148 | 292 | 257 | 530 |
| $D_S$ at 20 min, 3.2 mm | 151 | 304 | 261 | 567 |
| Time to $D_S$ max, 3.2 mm | 20.0 | 20.0 | 20.0 | 19.8 |

Examples 65-68 show that the block copolymer type—that is hydrogenated or non-hydrogenated rubber block—can have a surprising effect on the smoke density of the composition. In some embodiments, the smoke density at 4 minutes and/or Ds max (corrected) up to 20 minutes is less than 75% of the smoke density of the same composition made with a hydrogenated block copolymer. In other embodiments, the smoke density is less that 60%, and in other embodiments, less than 50% under at least one of $D_s$ at 4 minutes or $D_s$ max (corrected) up to 20 minutes. Example 65, when compared to Example 66, shows that compositions comprising a non-hydrogenated block copolymer (SBS in this case) have lower smoke densities than compositions comprising a hydrogenated block copolymer. A similar conclusion can be drawn from the comparison of Example 67 and Example 68.

EXAMPLES 69-78

Examples 69-78 were prepared using the composition summarized in Table 13. The components of the compositions were blended in a Henschel mixer and added at the feed throat of a 25-millimeter twin-screw extruder with a length to diameter ratio of 25.5:1. The extruder was operated at barrel temperatures of 260-290° C. and at speeds of 250-300 rpm. Feed rates were 25-50 pounds per hour (11-22 kilograms per hour). The blend was extruded into strands and pelletized. Pellets were subsequently molded into appropriately sized parts for smoke density, flammability and mechanical testing.

Example 69 was prepared using a fumaric acid-grafted poly(arylene ether) masterbatch. This masterbatch was prepared by melt mixing PPE I and fumaric acid in a weight ratio of 98 to 2. The masterbatch was then compounded with the other ingredients in a separate step. Example 73 is the counter example where the fumaric acid is instead added directly to the poly(arylene ether) powder and compounded in a single-step process. Examples 70 and 74 are examples with citric acid masterbatch and one-step process, respectively, analogous to fumaric acid Examples 69 and 73, with the citric acid-grafted poly(arylene ether) (CA-g-PPE) being prepared by melt mixing PPE I and citric acid in a weight ratio of 98 to 2. Examples 71 and 72 use a poly(arylene ether) that is a copolymer of 2,6-dimethylphenol and 2,3,6-trimethylphenol; they are comparable to Examples 73 and 74, respectively. Examples 75-78 employ a polysiloxane fluid 81893 (SE4029) that has viscosity similar to that of SF1706 and also has methoxy groups, but differs from SF1706 in that it does not have amine groups and it contains diphenyl siloxane units in addition to dimethyl siloxane units. Example 76 utilizes citric acid in addition to the polysiloxane fluid 81893 and is comparable to Example 41, which is a similar formulation with SF1706 instead of 81893. Example 77 includes 0.5% fumaric acid and provides a rough comparison to Example 45, which has a slightly lower level of fumaric acid (0.45%). Example 78 includes 0.5% succinic acid and provides a rough comparison to Example 47, which has a slightly lower level of succinic acid (0.45%).

TABLE 13

|  | 69 | 70 | 71 | 72 | 73 |
|---|---|---|---|---|---|
| PPE I | 0 | 0 | 0 | 0 | 70.07 |
| PPE IV | 0 | 0 | 70.07 | 70.07 | 0 |
| CA-g-PPE | 0 | 71.5 | 0 | 0 | 0 |
| FA-g-PPE | 71.5 | 0 | 0 | 0 | 0 |
| HIPS | 10 | 10 | 10 | 10 | 10 |
| SBS II | 5 | 5 | 5 | 5 | 5 |
| BPADP | 10 | 10 | 10 | 10 | 10 |
| Citric Acid | 0 | 0 | 0 | 1.43 | 0 |
| Succinic acid | 0 | 0 | 0 | 0 | 0 |
| Fumaric acid | 0 | 0 | 1.43 | 0 | 1.43 |
| SF1706 | 3.5 | 3.5 | 3.5 | 3.5 | 3.5 |
| 81893 (SE4029) | 0 | 0 | 0 | 0 | 0 |
| Total | 100 | 100 | 100 | 100 | 100 |
| Notched Izod Impact (kJ/m$^2$) | 12.9 | 16.6 | 14.4 | 12.6 | 12.4 |
| Standard Deviation | 1.7 | 0.8 | 1.4 | 0.5 | 0.6 |
| UL-94 FOT, sec, 1.6 mm | 3.2 | 4.2 | 7.9 | 5.8 | 2.5 |
| Standard Deviation | 0.7 | 0.7 | 1.2 | 1.1 | 0.6 |
| $D_s$ at 4 min at 3.2 mm thickness | 12 | 22 | 49 | 31 | 15 |
| Standard Deviation | 3 | 12 | 22 | 24 | 1 |
| $D_s$ max (corrected) at 3.2 mm thickness | 103 | 124 | 435 | 304 | 110 |
| Standard Deviation | 9 | 6 | 86 | 28 | 10 |
| Time for $D_s$ max, 3.2 mm thickness | 19.1 | 19.4 | 19.2 | 19.6 | 19.6 |
| Standard Deviation | 0.6 | 0.2 | 0.4 | 0 | 0.3 |

|  | 74 | 75* | 76 | 77 | 78 |
|---|---|---|---|---|---|
| PPE I | 70.07 | 71.5 | 71 | 71 | 71 |
| PPE IV | 0 | 0 | 0 | 0 | 0 |
| CA-g-PPE | 0 | 0 | 0 | 0 | 0 |
| FA-g-PPE | 0 | 0 | 0 | 0 | 0 |
| HIPS | 10 | 10 | 10 | 10 | 10 |
| SBS II | 5 | 5 | 5 | 5 | 5 |
| BPADP | 10 | 10 | 10 | 10 | 10 |
| Citric Acid | 1.43 | 0 | 0.5 | 0 | 0 |
| Succinic acid | 0 | 0 | 0 | 0 | 0.5 |
| Fumaric acid | 0 | 0 | 0 | 0.5 | 0 |
| SF1706 | 3.5 | 0 | 0 | 0 | 0 |
| 81893 (SE4029) | 0 | 3.5 | 3.5 | 3.5 | 3.5 |
| Total | 100 | 100 | 100 | 100 | 100 |
| Notched Izod Impact (kJ/m$^2$) | 15.5 | 9.9 | 11.3 | 10.5 | 8.3 |
| Standard Deviation | 1 | 1.4 | 1.1 | 1.6 | 1.4 |
| UL-94 FOT, sec, 1.6 mm | 2.6 | 1.7 | 3.5 | 3.2 | 5.2 |
| Standard Deviation | 1.6 | 1.3 | 2.6 | 2.4 | 2.5 |
| $D_s$ at 4 min at 3.2 mm thickness | 16 | 154 | 173 | 156 | 178 |
| Standard Deviation | 2 | 52 | 69 | 78 | 6 |
| $D_s$ max (corrected) at 3.2 mm thickness | 104 | 493 | 642 | 451 | 444 |
| Standard Deviation | 11 | 69 | 57 | 91 | 18 |
| Time for $D_s$ max, 3.2 mm thickness | 19.5 | 11.1 | 10.7 | 13.9 | 8.2 |
| Standard Deviation | 0.1 | 1.3 | 4.7 | 8 | 1.5 |

*Denotes comparative example

The analysis of examples 69, 70, 73, and 74 indicates that using a poly(arylene ether)-acid masterbatch versus one-step compounding of the acid does not make a big difference on the mechanical, flame, and smoke properties. Moreover, samples with citric acid and fumaric acid seem to have similar efficiencies. Example 70, which includes a poly(arylene ether)-citric acid masterbatch, does show a slightly higher notched Izod impact strength than the rest. The masterbatch Examples 69 and 70 also show slightly higher flame-out times compared to one-step-compounding Examples 73 and 74. On comparing examples 71, 72, 73, and 74, it is apparent that the flame and smoke properties are significantly worse for PPE IV, which is a copolymer of 2,6-dimethylphenol and 2,3,6-trimethylphenol, compared to PPE I, which is a homopolymer of 2,6-dimethylphenol. Examples 71 and 72 thus display higher flame-out time, 4 min smoke density, and $D_s$ max. However, the time at which the $D_s$ max is obtained seems to be similar for all of Examples 71-74.

Comparison of Examples 75-78 with Examples 40, 41, 45, and 47 indicates that the silicone fluid 81893 (SE4029) is not as effective as SF1706 in reducing the four minute smoke density or the $D_s$ max with values for $D_s$ at 4 min in the range of 154-178 for Examples 75-78, compared to the range of 14-19 for Examples 40, 41, 45, and 47. Similarly, the $D_s$ max (corrected) value for the samples with 81893 (SE4029) is also much higher, in the range of 444-642 versus 88-199 for Examples 40, 41, 45, and 47. Correspondingly, the time to $D_s$ max is also lower for Examples 75-78 compared to Examples 40, 41, 45, and 47, indicating that the samples are producing smoke somewhat faster in the case of 81893 (SE4029) versus SF1706.

EXAMPLES 79-85

Examples 79-85 were prepared using the compositions shown in Table 14. All ingredients were added at the feed throat, except for BPADP, which was liquid injected downstream. The blend was melt extruded in strands and pelletized. The pelletized compositions were injection molded into test specimens. Example 79 is a control example with no silicone fluid or citric acid added. Example 80 contain 3.5% SF1706, and Example 81 contains 3.5% SF1706 and 0.5% citric acid. Examples 82-85 contain the polysiloxane 81904LT, which has viscosity similar to SF1706 and also contains terminal methoxy groups. However, unlike SF1706, it does not have any amine functionality. Example 82 does not include citric acid, but Examples 83-85 contain 0.5% of citric acid in addition to containing different levels of 81904LT.

One observation that stood out during the molding of these samples is that whereas the SF1706 samples molded well, there was severe screw slippage during the molding of the 81904LT in addition to deformities on molded parts displaying delaminated resin. 81904LT thus has limited compatibility with the rest of the formulation, less so than SF1706.

The mechanical properties indicate that whereas SF1706 alone and SF1706 in combination with citric acid increase the notched Izod impact strength, the 81904LT shows only a moderate increase with 81904LT alone, and on addition of citric acid, the notched Izod impact strength increases significantly.

A reduction of flame-out time is observed with addition of SF1706, and a further reduction is associated with addition of citric acid. In the case of 81904LT, there is a significant decrease in the flame-out time at 3.5% of 81904LT, which increases slightly with addition of citric acid. However, increasing loadings of the 81904LT from 2.5% to 3.5% to 4.5% in combination with 0.5% citric acid are associated with a progressive increase in the flame-out time. The 4-minute smoke density and the $D_s$ max (corrected) values show that on addition of SF1706, both smoke densities decrease considerably from the control Example 79 from 265 to 21 and 20 respectively for the $D_s$ 4 min and from 504 to 105 and 119 respectively for $D_s$ max (corrected). With the addition of 81904LT, also there is also a decrease in smoke density $D_s$ 4 min from 265 (for control Example 79) to 129 (for Example 82). On addition of citric acid (example 83) smoke density $D_s$ 4 min remains nearly unchanged. Lower $D_s$ 4 min values of 78 and 77 are seen at lower and higher amounts of 81904LT (2.5% for example 84, 4.5% for example 85). The $D_s$ max (corrected) also shows a decrease from 504 to 297 for example 82 relative to control example 79. However, on addition of citric acid, there seems to be a negative effect with the $D_s$ max (corrected) increasing to 477 for the formulation with 0.5% citric acid, to 535 for the formulation with 2.5% 81904LT and 0.5% citric acid, and to 352 for the formulation with 4.5% 81904LT and 0.5% citric acid.

Thus, silicone fluid 81904LT, which has similar viscosity and methoxy content compared to SF1706 but no amine content, is less effective as a smoke suppressant and less compatible with the matrix investigated than SF1706. This indicates the surprising results obtained with SF1706.

TABLE 14

|  | 79* | 80* | 81 | 82* |
|---|---|---|---|---|
| PPE I | 75.0 | 71.5 | 71.0 | 71.5 |
| 81904LT Silicone Fluid | 0 | 0 | 0 | 3.5 |
| SF1706 | 0 | 3.5 | 3.5 | 0 |
| Citric Acid | 0 | 0 | 0.5 | 0 |
| SBS II | 5.0 | 5.0 | 5.0 | 5.0 |
| HIPS | 10.0 | 10.0 | 10.0 | 10.0 |
| BPADP | 10.0 | 10.0 | 10.0 | 10.0 |
| Total | 100 | 100 | 100 | 100 |
| Notched Izod Impact Strength, J/m (ASTM Test) | 135 | 278 | 281 | 146 |
| Standard Deviation | 6 | 22 | 19 | 29 |
| UL-94 Flame-out Time, 1.5 mm | 4.8 | 4.0 | 3.3 | 2.7 |
| Standard Deviation | 1.6 | 2.1 | 1.3 | 1.5 |
| Expected UL-94 rating | V-0 | V-0 | V-0 | V-0 |
| $D_S$ at 4 min at 3.2 mm thickness | 265 | 21 | 20 | 129 |
| Standard Deviation | 59 | 3 | 1 | 3 |
| $D_S$ max (corrected) at 3.2 mm thickness | 504 | 105 | 119 | 297 |
| Standard Deviation | 30 | 4 | 13 | 4 |
| $D_S$ 20 min at 3.2 mm thickness | 419 | 107 | 121 | 318 |
| Standard Deviation | 61 | 4 | 13 | 6 |
| Time for $D_S$ max at 3.2 mm thickness | 8.1 | 19.5 | 19.3 | 19.5 |
| Standard Deviation | 2.5 | 0.1 | 0.1 | 0.1 |
| Injection Moldability | Normal | Normal | Normal | Screw Slippage |
| Molded parts Aesthetics | Normal | Normal | Normal | Delamination |

|  | 83 | 84 | 85 |
|---|---|---|---|
| PPE I | 71.0 | 72.0 | 70.0 |
| 81904LT Silicone Fluid | 3.5 | 2.5 | 4.5 |
| SF1706 | 0 | 0 | 0 |
| Citric Acid | 0.5 | 0.5 | 0.5 |
| SBS II | 5.0 | 5.0 | 5.0 |
| HIPS | 10.0 | 10.0 | 10.0 |
| BPADP | 10.0 | 10.0 | 10.0 |
| Total | 100 | 100 | 100 |
| Notched Izod Impact Strength, J/m (ASTM Test) | 220 | 224 | 255 |
| Standard Deviation | 5 | 9 | 26 |
| UL-94 Flame-out Time, 1.5 mm | 4.4 | 3.2 | 5.0 |
| Standard Deviation | 1.8 | 1.5 | 3.7 |
| Expected UL-94 rating | V-0 | V-0 | V-1 |
| $D_S$ at 4 min at 3.2 mm thickness | 126 | 78 | 77 |
| Standard Deviation | 35 | 6 | 2 |
| $D_S$ max (corrected) at 3.2 mm thickness | 477 | 535 | 352 |
| Standard Deviation | 18 | 11 | 3 |
| $D_S$ 20 min at 3.2 mm thickness | 481 | 549 | 372 |
| Standard Deviation | 11 | 6 | 5 |
| Time for $D_S$ max at 3.2 mm thickness | 19.8 | 18.1 | 19.1 |
| Standard Deviation | 0.3 | 1.4 | 0.7 |
| Injection Moldability | Screw Slippage | Screw Slippage | Screw Slippage |
| Molded parts Aesthetics | Delamination | Delamination | Delamination |

EXAMPLES 86-88

Examples 86-88 were compounded using the compositions summarized in Table 15. All ingredients other than HIPS and BPADP were mixed together in a blending bowl and fed to the feed throat of a 58-millimeter twin-screw extruder. HIPS pellet was fed separately at the feed throat while the BPADP was pumped in slightly downstream of the feed throat. The melt was mixed and strand pelletized. Parts were then molded for testing from pellets. As can be seen from the values of $D_s$ 4 min as well as $D_s$ max (corrected), addition of linear low density polyethylene, even in small amounts can have a deleterious effect on smoke density. Thus, Example 86 with 0.49 weight percent LLDPE has a $D_s$ 4 min of 34 and a $D_s$ max (corrected) of 104. When the LLDPE amount is increased to 0.98 weight percent (Example 87), the $D_s$ 4 min does not increase appreciably (41) but the $D_s$ max (corrected) increases considerably to 204. With a 1.93 weight percent loading of LLDPE, the $D_s$ 4 min increases appreciably to 100 with the $D_s$ max (corrected) also increasing dramatically to 318. Thus, it is preferable to have at most a small amount of LLDPE in the composition.

TABLE 15

| | 86 | 87 | 88 |
|---|---|---|---|
| PPE I | 68.16 | 67.83 | 67.17 |
| SF1706 | 3.43 | 3.41 | 3.38 |
| Citric Acid | 0.49 | 0.49 | 0.48 |
| SBS I | 4.90 | 4.88 | 4.83 |
| ZnS | 0.29 | 0.29 | 0.29 |
| ZnO | 0.15 | 0.15 | 0.14 |
| Irganox 1076 | 0.20 | 0.20 | 0.19 |
| Seenox 412S | 0.29 | 0.29 | 0.29 |
| LLDPE | 0.49 | 0.98 | 1.93 |
| Carbon Black | 0.05 | 0.05 | 0.05 |
| TiO$_2$ | 1.94 | 1.94 | 1.92 |
| HIPS | 9.81 | 9.75 | 9.66 |
| BPADP | 9.78 | 9.75 | 9.66 |
| Total | 100.0 | 100.0 | 100.0 |
| Screw Speed (rpm) | 500 | 500 | 513 |
| Feed Rate, lbs/hr | 900 | 900 | 900 |
| Vacuum level, inches of Hg | 16 | 16 | 14 |
| Notched Izod Impact Strength, J/m | 293 | 298 | 348 |
| Standard Deviation | 3 | 5 | 2 |
| UL 94 Flame-out Time, sec, 1.0 mm thickness | 3.55 | 4.6 | 4.25 |
| Standard Deviation | 1.6 | 2.4 | 2.1 |
| $D_S$ at 4 min, 3.2 mm thickness | 34 | 41 | 100 |
| Standard Deviation | 1 | 7 | 5 |
| $D_S$ max (corrected), 3.2 mm thickness | 106 | 204 | 318 |
| Standard Deviation | 8 | 16 | 4 |
| Time to $D_S$ max | 19.6 | 16.7 | 19.5 |
| Standard Deviation | 0.1 | 2.1 | 0.0 |

EXAMPLES 89-92

Examples 89-92 were compounded using the compositions shown in Table 16. A 53-millimeter extruder was used, and all the materials were added in the feed throat, except the flame retardant RDP, which was added downstream. The compounding conditions are as shown in Table 16. As can be seen from the values of $D_s$ 4 min and $D_s$ max (corrected), compounding at higher vacuum levels leads to lower smoke densities. Thus, formulations 90 and 92, which were compounded at 25 inches of Hg vacuum, display lower values of $D_s$ 4 min (77 and 83, respectively) and $D_s$ max (corrected) (270 and 267, respectively) compared to formulations 89 and 91, which were compounded at 10 inches of Hg vacuum and had higher values of $D_s$ 4 min (99 and 94, respectively) and $D_s$ max (corrected) (359 and 325, respectively). Thus, in some embodiments, the composition is prepared using an extruder comprising a vent with a vacuum of at least 15 inches of Hg (50.8 kilopascals).

TABLE 16

| | 89 | 90 | 91 | 92 |
|---|---|---|---|---|
| PPE II | 78.2 | 78.2 | 78.2 | 78.2 |
| SF1706 | 3.4 | 3.4 | 3.4 | 3.4 |
| Citric Acid | 0.49 | 0.49 | 0.49 | 0.49 |
| ZnS | 0.29 | 0.29 | 0.29 | 0.29 |
| ZnO | 0.15 | 0.15 | 0.15 | 0.15 |
| Irganox 1076 | 0.19 | 0.19 | 0.19 | 0.19 |
| Seenox 412S | 0.29 | 0.29 | 0.29 | 0.29 |
| LLDPE | 0.49 | 0.49 | 0.49 | 0.49 |
| Carbon Black | 0.02 | 0.02 | 0.02 | 0.02 |
| TiO2 | 1.94 | 1.94 | 1.94 | 1.94 |
| SEBS | 4.9 | 4.9 | 4.9 | 4.9 |
| RDP | 9.7 | 9.7 | 9.7 | 9.7 |
| Total | 100 | 100 | 100 | 100 |
| Screw Speed, rotations per minute | 200 | 200 | 300 | 300 |
| Extruder Screw size, mm | 53 | 53 | 53 | 53 |
| Feed Rate, lbs/hr | 130 | 130 | 130 | 130 |
| Vacuum level, in Hg | 10 | 25 | 10 | 25 |
| Notched Izod Impact Strength, ASTM Method, J/m | 274 | 272 | 248 | 239 |
| $D_S$ at 4 min, 3.2 mm thickness | 99 | 77 | 94 | 83 |
| Standard Deviation | 24 | 6 | 33 | 39 |
| $D_S$ max (corrected), 3.2 mm thickness | 359 | 270 | 325 | 267 |
| Standard Deviation | 26 | 6 | 30 | 33 |
| $D_S$ at 20 minutes, 3.2 mm thickness | 370 | 276 | 333 | 277 |
| Standard Deviation | 23 | 8 | 27 | 33 |
| Time to $D_S$ max | 19.40 | 19.60 | 19.50 | 19.50 |
| Standard Deviation | 0.20 | 0.10 | 0.10 | 0.10 |

EXAMPLES 93-96

Examples 93-96 were compounded using the compositions shown in Table 18. All ingredients other than HIPS or BPADP were mixed together in a Henschel Mixer and added to the feed throat of a 30-millimeter twin-screw extruder. HIPS was also added to the feed throat, though via a separate feeder, and BPADP was added downstream. The formulations were stranded, pelletized, and molded for testing. Examples 96 and 94 illustrate the effects of mold release agent type. Example 96 employs the polyepoxide mold release agent Pluronic F88, whereas Example 94 employs linear low density polyethylene. Example 96 has a much lower values of $D_s$ max (corrected) (123) compared to Example 94 (242). Example 93 shows a higher $D_s$ max (corrected) value (277) compared to Example 95 (91), possibly due to the lower poly(arylene ether) content which is substituted for with higher amounts of Arkon P-125 and BPADP. Example 93, however, still shows a very low value of 40 for $D_s$ at 4 min, compared to 23 for Example 95. A look at the Time to $D_s$ max indicates that Example 93 has a value of 15.7 as against 19.5 for Example 95.

TABLE 17

| | 93 | 94 | 95 | 96 |
|---|---|---|---|---|
| PPE I | 57.39 | 0.00 | 68.17 | 0.00 |
| PPE III | 0.00 | 60.33 | 0.00 | 60.33 |
| Arkon P125 | 4.90 | 0.00 | 0.00 | 0.00 |
| SF1706 | 3.43 | 3.43 | 3.43 | 3.43 |
| Citric Acid | 0.49 | 0.49 | 0.49 | 0.49 |
| Zinc Sulfide | 0.29 | 0.29 | 0.29 | 0.29 |

TABLE 17-continued

|  | 93 | 94 | 95 | 96 |
|---|---|---|---|---|
| Zinc Oxide | 0.15 | 0.15 | 0.15 | 0.15 |
| Hindered phenol antioxidant | 0.20 | 0.20 | 0.20 | 0.20 |
| SEENOX 412S | 0.29 | 0.29 | 0.29 | 0.29 |
| LLDPE | 0.49 | 0.49 | 0.49 | 0.00 |
| SBS II | 4.90 | 4.90 | 4.90 | 4.90 |
| Carbon Black | 0.02 | 0.02 | 0.02 | 0.02 |
| $TiO_2$ | 1.96 | 1.96 | 1.96 | 1.96 |
| Pluronic F88 | 0.00 | 0.00 | 0.00 | 0.49 |
| HIPS | 9.80 | 14.70 | 9.80 | 14.70 |
| BPADP | 15.68 | 12.74 | 9.80 | 12.74 |
| Total | 100.00 | 100.00 | 100.00 | 100.00 |
| Notched Izod Impact Strength, ASTM Method, J/m | 164.0 | 147.0 | 208.0 | 157.0 |
| Calc viscosity, 1500 1/s/0, L/D/ = 20/1, 280 C., Pa-s | 181 | 195 | 365 | 191 |
| $D_S$ at 4 min, 3.2 mm thickness | 40 | 45 | 23 | 35 |
| Standard Deviation | 11 | 11 | 6 | 16 |
| $D_S$ max (corrected), 3.2 mm thickness | 277 | 242 | 91 | 123 |
| Standard Deviation | 35 | 7 | 10 | 17 |
| Time to $D_S$ max | 15.7 | 18.4 | 19.5 | 19.5 |
| Standard Deviation | 3.7 | 2.0 | 0.0 | 0.1 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A thermoplastic composition, comprising:
52.8 to 78.2 weight percent of a poly(2,6-dimethyl-1,4-phenylene ether) having an intrinsic viscosity of 0.33 to 0.46 deciliter per gram, measured at 25° C. in chloroform;
4.9 to 15 weight percent of a rubber-modified polystyrene;
4.86 to 9.5 weight percent of a polystyrene-polybutadiene-polystyrene triblock copolymer;
4.86 to 15.2 weight percent of an organophosphate ester flame retardant selected from the group consisting of bisphenol A bis(diphenyl phosphate), resorcinol bis(diphenyl phosphate), and mixtures thereof;
2.8 to 4.7 weight percent of a functionalized polysiloxane comprising alkoxy substituents and aminoalkyl substituents comprising at least one primary or secondary amine; wherein the functionalized polysiloxane has a viscosity at 23° C. of 10 to 200 centistokes; and
0.46 to 1.43 weight percent of an organic acid selected from the group consisting of citric acid, fumaric acid, succinic acid, and maleic anhydride;
wherein the thermoplastic composition comprises less than 0.5 weight percent of polyamide;
wherein all weight percents are based on the total weight of the thermoplastic composition; and
wherein the thermoplastic composition has at least one smoke density property selected from the group consisting of
a smoke density at four minutes of 5 to 250 as determined by ASTM E662 at a sample thickness of 1.5 to 3.2 millimeters, and
a corrected maximum smoke density of 20 to 300 in the initial 20 minutes as determined by ASTM E662 at a sample thickness of 1.5 to 3.2 millimeters.

2. The thermoplastic composition of claim 1, wherein the thermoplastic composition has a smoke density at four minutes of 5 to 250 as determined by ASTM E662 at a sample thickness of 3.2 millimeters.

3. The thermoplastic composition of claim 1, wherein the thermoplastic composition has a corrected maximum smoke density of 20 to 300 in the initial 20 minutes as determined by ASTM E662 at a sample thickness of 3.2 millimeters.

4. The thermoplastic composition of claim 1, wherein the thermoplastic composition further has a UL 94 rating of V-1 or V-0 at a sample thickness of 1.6 to 3.2 millimeters.

5. The thermoplastic composition of claim 1, wherein the thermoplastic composition further has a UL 94 rating of V-1 or V-0 at a sample thickness of 1.0 to 1.6 millimeters.

6. The thermoplastic composition of claim 1, wherein the thermoplastic composition has a UL 94 rating of V-0 at a sample thickness of 1.6 to 3.2 millimeters.

7. The thermoplastic composition of claim 1, wherein the thermoplastic composition has a UL 94 rating of V-0 at a sample thickness of 1.0 to 1.6 millimeters.

8. The thermoplastic composition of claim 1, wherein the thermoplastic composition has a notched Izod impact strength of at least 180 Joules per meter measured at 23° C. according ASTM D256.

9. The thermoplastic composition of claim 1, wherein the thermoplastic composition has a notched Izod impact strength of 180 to 350 Joules per meter measured at 23° C. according ASTM D256.

10. The thermoplastic composition of claim 1, wherein the functionalized polysiloxane comprises a 3-[(2-aminoethyl)amino]propyl group.

11. The thermoplastic composition of claim 1, further comprising 0.1 to 3 weight percent of a linear low density polyethylene.

12. The thermoplastic composition of claim 1, wherein the thermoplastic composition is substantially free of polyamides, polyesters, polyarylates, polyetherimides, and polycarbonates.

13. The thermoplastic composition of claim 1, wherein the poly(2,6-dimethyl-1,4-phenylene ether) and the organic acid are provided in the form of melt-mixing poly(2,6-dimethyl-1,4-phenylene ether) and an organic acid selected from the group consisting of citric acid, fumaric acid, and maleic anhydride.

14. The thermoplastic composition of claim 1, wherein the functionalized polysiloxane has the formula $$R^1-\underset{\underset{CH_3}{|}}{\overset{\overset{R^1}{|}}{Si}}-O-\left[\underset{\underset{CH_3}{|}}{\overset{\overset{CH_3}{|}}{Si}}-O\right]_x-\left[\underset{\underset{R^4}{|}}{\overset{\overset{R^3}{|}}{Si}}-O\right]_y-\underset{\underset{CH_3}{|}}{\overset{\overset{R^2}{|}}{Si}}-R^2$$

wherein each occurrence of $R^1$ and $R^2$ is independently a $C_1$-$C_5$ alkoxy substituent; $R^3$ is a $C_1$-$C_5$ alkyl or a $C_1$-$C_{10}$ aminoalkyl group comprising a primary amine or a secondary amine, provided that at least one occurrence of $R^3$ is a $C_1$-$C_{10}$ aminoalkyl group comprising a primary amine or a secondary amine; each occurrence of $R^4$ is a $C_1$-$C_5$ alkyl substituent or a bridging oxygen; x is 10 to 100; and y is 1 to 25.

15. The thermoplastic composition of claim 14, wherein at least one occurrence of $R^3$ is 3-[(2-aminoethyl)amino]propyl.

16. The thermoplastic composition of claim 14, wherein each occurrence of $R^1$ and $R^2$ is methoxy; each occurrence of $R^3$ is independently methyl or 3-[(2-aminoethyl)amino]propyl, provided that at least one occurrence of $R^3$ is 3-[(2-aminoethyl)amino]propyl; $R^4$ is a bridging oxygen or methyl; and y is 1 to 10.

17. A thermoplastic composition, comprising the reaction products obtained on melt kneading:
    52.8 to 78.2 weight percent of a poly(2,6-dimethyl-1,4-phenylene ether) having an intrinsic viscosity of 0.33 to 0.46 deciliter per gram, measured at 25° C. in chloroform;
    4.9 to 15 weight percent of a rubber-modified polystyrene;
    4.86 to 9.5 weight percent of a polystyrene-polybutadiene-polystyrene triblock copolymer;
    4.86 to 15.2 weight percent of an organophosphate ester flame retardant selected from the group consisting of bisphenol A bis(diphenyl phosphate), resorcinol bis(diphenyl phosphate), and mixtures thereof;
    2.8 to 4.7 weight percent of a functionalized polysiloxane comprising alkoxy substituents and aminoalkyl substituents comprising at least one primary or secondary amine; wherein the functionalized polysiloxane has a viscosity at 23° C. of 10 to 200 centistokes; and
    0.46 to 1.43 weight percent of an organic acid selected from the group consisting of citric acid, fumaric acid, succinic acid, and maleic anhydride;
    wherein the thermoplastic composition comprises less than 0.5 weight percent of polyamide;
    wherein all weight percents are based on the total weight of the thermoplastic composition; and
    wherein the thermoplastic composition has at least one smoke density property selected from the group consisting of
        a smoke density at four minutes of 5 to 250 as determined by ASTM E662 at a sample thickness of 1.5 to 3.2 millimeters, and
        a corrected maximum smoke density of 20 to 300 in the initial 20 minutes as determined by ASTM E662 at a sample thickness of 1.5 to 3.2 millimeters.

18. A thermoplastic composition, comprising:
    60 to 78.2 weight percent of poly(2,6-dimethyl-1,4-phenylene ether) having an intrinsic viscosity of 0.35 to 0.45 deciliter per gram, measured at 25° C. in chloroform;
    5 to 15 weight percent of a rubber-modified polystyrene;
    4.86 to 9.5 weight percent of a polystyrene-polybutadiene-polystyrene triblock copolymer;
    5 to 15 weight percent of bisphenol A bis(diphenyl phosphate);
    2.8 to 4.7 weight percent of a functionalized polysiloxane having the formula $$H_3CO-\underset{\underset{CH_3}{|}}{\overset{\overset{OCH_3}{|}}{Si}}-O-\left[\underset{\underset{CH_3}{|}}{\overset{\overset{CH_3}{|}}{Si}}-O\right]_x-\left[\underset{\underset{R^4}{|}}{\overset{\overset{R^3}{|}}{Si}}-O\right]_y-\underset{\underset{CH_3}{|}}{\overset{\overset{OCH_3}{|}}{Si}}-OCH_3$$

wherein each occurrence of $R^3$ is independently methyl or a 3-[(2-aminoethyl)amino]propyl group, provided that at least one occurrence of $R^3$ is a 3-[(2-aminoethyl)amino]propyl group; each occurrence of $R^4$ is independently methyl or a bridging oxygen; x is 10 to 100; and y is 1 to 10; and
    0.46 to 1 weight percent of citric acid;
    wherein the thermoplastic composition comprises less than 0.5 weight percent of polyamide; and
    wherein all weight percents are based on the total weight of the composition; and
    wherein the thermoplastic composition has
        a smoke density at four minutes of 5 to 250 as determined by ASTM E662 at a sample thickness of 3.2 millimeters,
        a corrected maximum smoke density of 20 to 300 in the initial 20 minutes as determined by ASTM E662 at a sample thickness of 3.2 millimeters, and
        a UL 94 rating of V-0 at a sample thickness of 1.6 to 3.2 millimeters.

19. The thermoplastic composition of claim 18, wherein the thermoplastic composition has a notched Izod impact strength of 180 to 350 Joules per meter measured at 23° C. according ASTM D256.

20. A thermoplastic composition, consisting of:
    60 to 78.2 weight percent of poly(2,6-dimethyl-1,4-phenylene ether) having an intrinsic viscosity of 0.35 to 0.45 deciliter per gram, measured at 25° C. in chloroform;
    5 to 15 weight percent of a rubber-modified polystyrene;
    4.86 to 9.5 weight percent of a polystyrene-polybutadiene-polystyrene triblock copolymer;
    5 to 15 weight percent of bisphenol A bis(diphenyl phosphate);
    2.8 to 4.7 weight percent of a functionalized polysiloxane having the formula $$H_3CO-\underset{\underset{CH_3}{|}}{\overset{\overset{OCH_3}{|}}{Si}}-O-\left[\underset{\underset{CH_3}{|}}{\overset{\overset{CH_3}{|}}{Si}}-O\right]_x-\left[\underset{\underset{R^4}{|}}{\overset{\overset{R^3}{|}}{Si}}-O\right]_y-\underset{\underset{CH_3}{|}}{\overset{\overset{OCH_3}{|}}{Si}}-OCH_3$$

wherein each occurrence of $R^3$ is independently methyl or a 3-[(2-aminoethyl)amino]propyl group, provided that at least one occurrence of $R^3$ is a 3-[(2-aminoethyl)amino]propyl group; $R^4$ is a bridging oxygen or methyl; x is 10 to 100; and y is 1 to 10;
    0.46 to 1 weight percent of citric acid; and
    optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof;
    wherein the thermoplastic composition comprises less than 0.5 weight percent of polyamide;

wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

21. The thermoplastic composition of claim 20, wherein the thermoplastic composition has a notched Izod impact strength of 180 to 350 Joules per meter measured at 23° C. according ASTM D256.

22. An article comprising a thermoplastic composition comprising:

52.8 to 7.2 weight percent of a poly(2,6-dimethyl-1,4-phenylene ether) having an intrinsic viscosity of 0.33 to 0.46 deciliter per gram, measured at 25° C. in chloroform;

4.9 to 15 weight percent of a rubber-modified polystyrene;

4.86 to 9.5 weight percent of a polystyrene-polybutadiene-polystyrene triblock copolymer;

4.86 to 15.2 weight percent of an organophosphate ester flame retardant selected from the group consisting of bisphenol A bis(diphenyl phosphate), resorcinol bis(diphenyl phosphate), and mixtures thereof;

2.8 to 4.7 weight percent of a functionalized polysiloxane comprising alkoxy substituents and aminoalkyl substituents comprising at least one primary or secondary amine; wherein the functionalized polysiloxane has a viscosity at 23° C. of 10 to 200 centistokes; and 0.46 to 1.43 weight percent of an organic acid selected from the group consisting of citric acid, fumaric acid, succinic acid, and maleic acid;

wherein the thermoplastic composition comprises less than 0.5 weight percent of polyamide;

wherein all weight percents are based on the total weight of the thermoplastic composition; and wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

23. An article comprising a thermoplastic composition comprising:

60 to 78.2 weight percent of poly(2,6-dimethyl-1,4-phenylene ether) having an intrinsic viscosity of 0.35 to 0.45 deciliter per gram, measured at 25° C. in chloroform;

5 to 15 weight percent of a rubber-modified polystyrene;

4.86 to 9.5 weight percent of a polystyrene-polybutadiene-polystyrene triblock copolymer;

5 to 15 weight percent of bisphenol A bis(diphenyl phosphate);

2.8 to 4.7 weight percent of a functionalized polysiloxane having the formula $$H_3CO-\underset{\underset{CH_3}{|}}{\overset{\overset{OCH_3}{|}}{Si}}-O-\left[\underset{\underset{CH_3}{|}}{\overset{\overset{CH_3}{|}}{Si}}-O\right]_x-\left[\underset{\underset{R^4}{|}}{\overset{\overset{R^3}{|}}{Si}}-O\right]_y-\underset{\underset{CH_3}{|}}{\overset{\overset{OCH_3}{|}}{Si}}-OCH_3$$

wherein each occurrence of $R^3$ is independently methyl or a 3-[(2-aminoethyl)amino]propyl group, provided that at least one occurrence of $R^3$ is a 3-[(2-aminoethyl)amino]propyl group; each occurrence of $R^4$ is independently methyl or a bridging oxygen; x is 10 to 100; and y is 1 to 10; and 0.46 to 1 weight percent of citric acid;

wherein the thermoplastic composition comprises less than 0.5 weight percent of polyamide; and wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

24. An article comprising a thermoplastic composition consisting of:

60 to 78.2 weight percent of poly(2,6-dimethyl-1,4-phenylene ether) having an intrinsic viscosity of 0.35 to 0.45 deciliter per gram, measured at 25° C. in chloroform;

5 to 15 weight percent of a rubber-modified polystyrene;

4.86 to 9.5 weight percent of a polystyrene-polybutadiene-polystyrene triblock copolymer;

5 to 15 weight percent of bisphenol A bis(diphenyl phosphate);

2.8 to 4.7 weight percent of a functionalized polysiloxane having the formula $$H_3CO-\underset{\underset{CH_3}{|}}{\overset{\overset{OCH_3}{|}}{Si}}-O-\left[\underset{\underset{CH_3}{|}}{\overset{\overset{CH_3}{|}}{Si}}-O\right]_x-\left[\underset{\underset{R^4}{|}}{\overset{\overset{R^3}{|}}{Si}}-O\right]_y-\underset{\underset{CH_3}{|}}{\overset{\overset{OCH_3}{|}}{Si}}-OCH_3$$

wherein each occurrence of $R^3$ is independently methyl or a 3-[(2-aminoethyl)amino]propyl group, provided that at least one occurrence of $R^3$ is a 3-[(2-aminoethyl)amino]propyl group; $R^4$ is a bridging oxygen or methyl; x is 10 to 100; and y is 1 to 10;

0.46 to 1 weight percent of citric acid; and optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof;

wherein the thermoplastic composition comprises less than 0.5 weight percent of polyamide;

wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

25. A method of preparing a thermoplastic composition, comprising:

melt kneading 52.8 to 78.2 weight percent of a poly(2,6-dimethyl-1,4-phenylene ether) having an intrinsic viscosity of 0.33 to 0.46 deciliter per gram, measured at 25° C. in chloroform, 4.9 to 15 weight percent of a rubber-modified polystyrene, 4.86 to 9.5 weight percent of a polystyrene-polybutadiene-polystyrene triblock copolymer, 4.86 to 15.2 weight percent of an organophosphate ester flame retardant selected from the group consisting of bisphenol A bis(diphenyl phosphate), resorcinol bis(diphenyl phosphate), and mixtures thereof, 2.8 to 4.7 weight percent of a functionalized polysiloxane comprising alkoxy substituents and aminoalkyl substituents comprising at least one primary or secondary amine, wherein the functionalized polysiloxane has a viscosity at 23° C. of 10 to 200 centistokes, and 0.46 to 1.43 weight percent of an organic acid selected from the group consisting of citric acid, fumaric acid, succinic acid, and maleic anhydride to form a thermoplastic composition;

wherein the thermoplastic composition comprises less than 0.5 weight percent of polyamide;

wherein all weight percents are based on the total weight of the thermoplastic composition; and wherein the thermoplastic composition has at least one smoke density property selected from the group consisting of a smoke density at four minutes of 5 to 250 as determined by ASTM E662 at a sample thickness of 1.5 to 3.2 millimeters, and a corrected maximum smoke density of 20 to 300 in the initial 20 minutes as determined by ASTM E662 at a sample thickness of 1.5 to 3.2 millimeters.

26. The method of claim 25, wherein the melt kneading is conducted on an extruder comprising a vacuum vent in the downstream one third of the extruder; and wherein the vacuum vent is maintained at a vacuum of 30 to 76 centimeters of mercury.

27. A method of preparing a thermoplastic composition, comprising:

melt kneading 60 to 78.2 weight percent of poly(2,6-dimethyl-1,4-phenylene ether) having an intrinsic viscosity of 0.35 to 0.45 deciliter per gram, measured at 25° C. in chloroform, 5 to 15 weight percent of a rubber-modified polystyrene, 4.86 to 9.5 weight percent of a polystyrene-polybutadiene-polystyrene triblock copolymer, 5 to 15 weight percent of bisphenol A bis(diphenyl phosphate), 2.8 to 4.7 weight percent of a functionalized polysiloxane having the formula

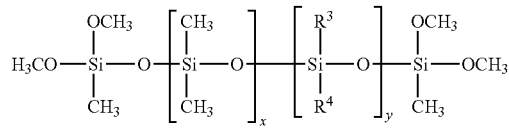

wherein each occurrence of $R^3$ is independently methyl or a 3-[(2-aminoethyl)amino]propyl group, provided that at least one occurrence of $R^3$ is a 3-[(2-aminoethyl)amino]propyl group, $R^4$ is a bridging oxygen or methyl, x is 10 to 100, and y is 1 to 10, and 0.46 to 1 weight percent of citric acid to form a thermoplastic composition;

wherein the thermoplastic composition comprises less than 0.5 weight percent of polyamide;

wherein all weight percents are based on the total weight of the composition; and wherein the thermoplastic composition has a smoke density at four minutes of 5 to 250 as determined by ASTM E662 at a sample thickness of 3.2 millimeters, a corrected maximum smoke density of 20 to 300 in the initial 20 minutes as determined by ASTM E662 at a sample thickness of 3.2 millimeters, and a UL 94 rating of V-0 at a sample thickness of 1.6 to 3.2 millimeters.

28. The method of claim 27, wherein the melt kneading is conducted on an extruder comprising a vacuum vent in the downstream one third of the extruder; and wherein the vacuum vent is maintained at a vacuum of 30 to 76 centimeters of mercury.

* * * * *